(12) United States Patent
Schmidt et al.

(10) Patent No.: US 11,460,056 B2
(45) Date of Patent: Oct. 4, 2022

(54) HELIX AMPLIFIER FITTINGS

(71) Applicant: SOMARAKIS HELIX ELBOW PIPING LLC, Kalama, WA (US)

(72) Inventors: Paul Schmidt, Kalama, WA (US); John Somarakis, Kalama, WA (US)

(73) Assignee: Somarakis Helix Elbow, LLC, Kalama, WA (US)

( * ) Notice: Subject to any disclaimer, the term of this patent is extended or adjusted under 35 U.S.C. 154(b) by 0 days.

(21) Appl. No.: 16/951,447

(22) Filed: Nov. 18, 2020

(65) Prior Publication Data

US 2021/0071692 A1 Mar. 11, 2021

Related U.S. Application Data

(63) Continuation of application No. 16/383,965, filed on Apr. 15, 2019, now abandoned, which is a continuation of application No. 15/520,555, filed as application No. PCT/US2015/056536 on Oct. 20, 2015, now Pat. No. 10,302,104.

(60) Provisional application No. 62/202,108, filed on Aug. 6, 2015, provisional application No. 62/090,571, filed on Dec. 11, 2014, provisional application No. 62/089,968, filed on Dec. 10, 2014, provisional application No. 62/087,978, filed on Dec. 5, 2014, provisional application No. 62/066,189, filed on Oct. 20, 2014.

(51) Int. Cl.
| | | |
|---|---|---|
| *F15D 1/04* | (2006.01) |
| *F16L 55/027* | (2006.01) |
| *F16L 43/00* | (2006.01) |
| *F16L 57/06* | (2006.01) |
| *F15D 1/02* | (2006.01) |

(52) U.S. Cl.
CPC ............... *F15D 1/04* (2013.01); *F15D 1/02* (2013.01); *F16L 43/00* (2013.01); *F16L 55/02772* (2013.01); *F16L 57/06* (2013.01)

(58) Field of Classification Search
CPC ............ B01F 5/0614; B01F 5/0615; B01F 2005/0629; B01F 5/0619
USPC ............... 138/37, 39; 366/336, 337, 339
See application file for complete search history.

(56) References Cited

U.S. PATENT DOCUMENTS

| | | | | |
|---|---|---|---|---|
| 2,095,242 A | * | 10/1937 | Dick | F23D 11/10 239/400 |
| 2,300,130 A | * | 10/1942 | McCurdy | F01N 1/12 181/274 |
| 3,190,618 A | * | 6/1965 | Katzen | B01F 5/0659 366/337 |
| 3,313,577 A | * | 4/1967 | Wolfe | F15D 1/065 406/46 |
| 3,582,045 A | * | 6/1971 | Leybourne, III | B01F 5/0614 366/339 |
| 3,610,706 A | * | 10/1971 | Meyer | B65G 53/52 406/45 |

(Continued)

*Primary Examiner* — Patrick F Brinson
(74) *Attorney, Agent, or Firm* — Mark E. Beatty; Rylander & Associates P.C.

(57) ABSTRACT

A helix amplifier pipe fitting may include an elbow or straight pipe fitting including an expanded helix portion, a plurality of helix vanes at an angle of incidence to the incoming fluid flow to impart rotational velocity on the fluid. A helix amplifier may include a helix discharge amplifier having a tapered canister, a tapered helix portion including a plurality of helix vanes, and a tapered mixing chamber.

9 Claims, 27 Drawing Sheets

(56) References Cited

U.S. PATENT DOCUMENTS

| | | | | |
|---|---|---|---|---|
| 3,949,970 | A * | 4/1976 | ter Braak | B01F 5/0614 366/339 |
| 4,093,188 | A * | 6/1978 | Horner | B29B 7/325 366/336 |
| 5,277,494 | A * | 1/1994 | Lehrke | B01F 5/0656 366/339 |
| 5,632,962 | A * | 5/1997 | Baker | B01J 19/006 422/211 |
| 6,854,341 | B2 * | 2/2005 | Oddie | G01F 1/34 73/861.52 |
| 6,997,214 | B2 * | 2/2006 | Kuo | F15D 1/02 138/109 |
| 7,066,409 | B2 * | 6/2006 | Negoro | B05B 1/3447 138/42 |
| 7,644,733 | B2 * | 1/2010 | Jones | F15D 1/065 138/37 |
| 9,259,694 | B2 * | 2/2016 | Hanada | B01F 5/0644 |
| 2009/0201761 | A1 * | 8/2009 | Matsuno | B01F 5/0057 366/165.2 |
| 2011/0188341 | A1 * | 8/2011 | Wiechers | B01F 5/0614 366/339 |
| 2016/0252113 | A1 * | 9/2016 | Nord | F17D 1/16 137/810 |
| 2017/0138540 | A1 * | 5/2017 | Dronen | F15D 1/06 |

* cited by examiner

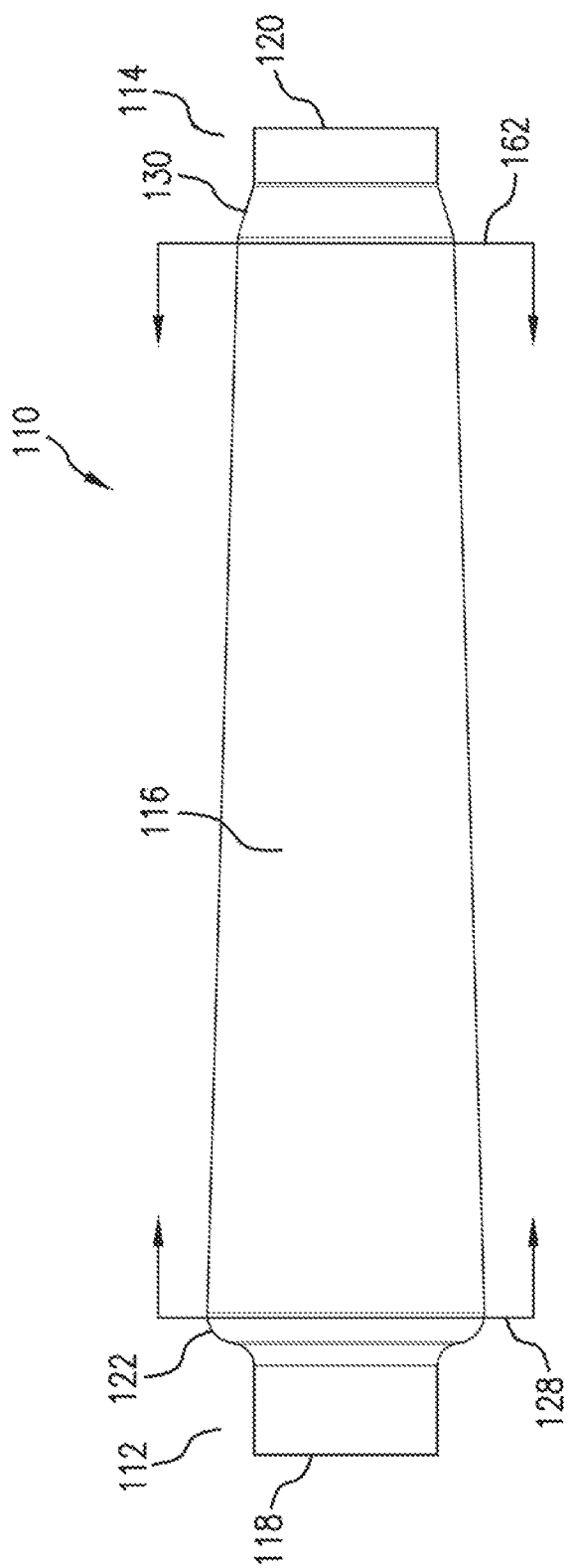

HELIX AMPLIFIER FITTINGS

CROSS-REFERENCE TO RELATED APPLICATIONS

This application is a continuation of and claims benefit to U.S. patent application Ser. No. 16/383,965 filed Apr. 15, 2019, which is a continuation of and claimed priority to U.S. patent application Ser. No. 15/520,555 filed Apr. 20, 2017. Application Ser. No. 15/520,555 is the U.S. National Stage application claiming priority to PCT Application PCT/US2015/056536, filed Oct. 20, 2015 which claims benefit of the following U.S. Provisional Patent Applications: Ser. No. 62/202,108 filed Aug. 6, 2015; Ser. No. 62/066,189 filed Oct. 20, 2014; Ser. No. 62/089,968 filed Dec. 10, 2014; Ser. No. 62/090,571 filed Dec. 11, 2014; and, Ser. No. 62/087,978 filed Dec. 5, 2014. The disclosures of the preceding PCT Application, U.S. Nonprovisional Patent Applications, and U.S. Provisional Patent Applications are hereby incorporated into this application in their entireties.

BACKGROUND

Uneven erosion in piping systems, especially elbow fittings, leads to pipe failure or early fitting replacement, either of which is costly in material, manpower and downtime. Applications for transporting and pumping fluids and media comprising abrasive contents, such as coal and sand slurries, wet sand, gravel and similar contents, suffer especially high costs from uneven component wear.

When fluids/media pass through an elbow fitting, the change in direction creates turbulent conditions, flow separation and vortex shedding along the pipe wall at the inside of the bend, and may create standing eddies causing backflow conditions at points along the fitting pipe walls. The conditions generally cause the elbow fitting pipe wall along the outside of the bend to erode substantially faster than the pipe wall along the inside of the bend, as the fluid/media impinges directly against the wall along the outside of the bend as it enters the fitting and changes direction. Additionally, heavier solids and particulates will be thrown to the outside wall as the fluid/media changes direction, so will continually scour the outer wall with new solid/particulate materials. In addition to high rates of localized wear on pipe walls, the turbulence and flow separation in the elbow fittings create head loss which must be compensated for by higher pressure pumps, and can create severe vibration and heating problems in the piping system.

Long radius elbow fittings and pipe sections can reduce these effects. However, long radius fittings require a great deal of space relative to standard short radius fittings. Additionally, long radius fittings still suffer accelerated erosion rates along the pipe wall along the outside of the bend because momentum still causes heavier particulate materials to be thrown to the outer wall, and they are continually scoured by new particulate/aggregate material.

A similar uneven erosion effect is experienced in long straight pipe runs, as the concentration of particulates will increase in the lower region of the fluid in long straight runs, making the bottom portion of the fluid stream more abrasive the upper portion. Additionally, in large diameter piping systems, the weight of the fluid and media is born by the lower pipe wall portion, causing higher erosion rates.

The inventors developed a new elbow fitting design which substantially eliminates uneven erosion within the fitting by inserting helix vanes along the outside pipe wall, which rotates the fluid around the piping centerline axis through the bend of the fitting. In addition, the elbow cross section is expanded in the direction of the outside pipe wall, which traps a layer of particulates in the helix channels between the helix vanes. During steady flow conditions, the fluid/media stream continuously erodes and redeposits this deposit layer rather than directly against the pipe wall. The rotation causes the fluid/media stream to follow nearly equal path lengths through the elbow fitting, and forces flow along the inside pipe wall as well as the outside pipe wall, with a more uniform velocity profile around the entire pipe wall, such that pipe wall erosion is distributed evenly around the circumference of the pipe wall throughout the elbow fitting. The beneficial even pipe wear has been found to extend far downstream of a helix elbow fitting as well.

The inventors discovered additional benefits, as well. Head loss through a helix elbow fitting was found to be substantially less than conventional elbow fittings. The inventors believe this is due to several factors. The helix vanes and channels channelize the flow closest to the pipe wall, thereby maintaining laminar flow conditions (or closer to laminar flow conditions) within the channels through the elbow fitting. The rotation causes all of the fluid streams to follow substantially equal path lengths through the fitting, reducing or eliminating flow separation and eddy losses. Additionally, rotating the fluid streams around the pipe wall circumference creates a longer effective bend radius as the flow streams follow longer paths through the same bend angle. Finally, the clockwise rotation creates a resulting torque vector, based on the Right Hand Rule, which aligns with the nominal pipe centerline, similar to a rifling effect.

The inventors found that the improved erosion profiles and head loss reduction extended far downstream, as well. The inventors therefore developed helix straight fittings for installation in straight piping runs as well. The rotation imparted on the fluid/media streams substantially eliminated localized bottom wall erosion downstream, and reduced head loss in the downstream piping runs. The expanded cross-section of the helix portion provided a similar sacrificial deposit layer, reducing erosion along the fitting pipe walls.

For general applications, the inventors found that at least three helix vanes were necessary to impart sufficient rotation on the fluid/media stream. However, the optimum number and spacing of the helix vanes is dependent on the anticipated fluid/media properties, including pressure, flow velocity, specific gravity, viscosity, temperature, particulate loading and size, incline, angle of change, and pipe material. Optimization can be performed using flow modeling software that is widely available, as well as interpolating empirical data from installed systems, which is within ordinary skill of persons in this field.

The inventors found that the downstream flow improvements from the helix straight fittings could be used to improve discharge hose performance as well, for example in firefighting situations, water blasting operations, irrigation applications, water cannons, and other applications requiring accurate projection of a concentrated fluid stream over a distance. Installing a helix discharge amplifier immediately upstream of a discharge nozzle created a very concentrated discharge stream, due to the rotation, with improved discharge velocity due to the reducing effect and reduced head loss through the discharge nozzle. Additionally, the improved concentration provided by the stream rotation eliminated the need for flow straighteners upstream of the discharge nozzles, eliminating a major source of head loss.

An additional, unanticipated benefit was obtained from the helix discharge amplifier. Newton's Third Law of Motion states that when one body exerts a force on a second body, the second body simultaneously exerts a force equal in magnitude and opposite in direction on the first body. The result, for firefighters operating firehoses, is that the hose operators must exert a force equal to the force of the water exiting the hose nozzle in order to control the hose nozzle—i.e. the force of over a hundred gallons per minute of pressurized water, referred to as "back pressure" or "hose kick". Normally, three firefighters are required to operate a single 1.5-inch or 2.5-inch hose/nozzle due to the reaction force, referred to as "hose kick" or "kickback". The nozzleman holds and directs the discharge nozzle itself. The backup nozzleman physically supports the nozzleman, assists in holding up the weight of the hose and nozzle, and provides relief when the nozzleman becomes fatigued. The hoseman assists in moving the hose behind the nozzleman and backup nozzleman, to align it with the nozzle orientation so the nozzle is easier to direct, and provides relief when the others become fatigued. However, installing a helix discharge amplifier immediately upstream of the nozzle virtually eliminated hose kick. In testing, the improvement was so substantial that a single firefighter could operate the hose nozzle for extended periods, without backup, and even hold and direct the nozzle with one arm. The discharge stream was also much more focused and accurate, and maintained this concentration and accuracy over a longer distance.

SUMMARY AND ADVANTAGES

A helix elbow fitting includes a plurality of helix vanes disposed along the interior pipe wall along the outside of the bend, the helix vanes being at an angle of incidence to the incoming fluid flow in order to impart rotation on the fluid stream. A helix elbow fitting includes an expanded cross-section in the region of the helix vanes, thereby creating a deposit layer in the helix channels and lengthening the effective bend radius of the fluid stream through the elbow fitting. The helix elbow fitting includes and expander and reducer to transition between the nominal system pipe diameter and the helix portion expanded cross-section. The helix vanes project into the fluid stream, preferably past the outer boundary layer or at least 10 percent of the nominal system pipe diameter, or at least 10 percent of the major axis of the helix portion expanded cross-section. Each helix vane extends from a first end to a second end, but does not extend around the circumference of the elbow fitting pipe wall.

A helix straight fitting includes an expanded helix portion having a cross-section symmetrical and concentric to the nominal pipe system cross-section, at least at the inlet, and a plurality of vanes distributed equidistantly around the circumference of the helix portion cross-section. The helix straight fitting includes and expander and reducer to transition between the nominal system pipe diameter and the helix portion expanded cross-section. Each of the helix vanes is oriented at an angle of incidence to the incoming flow, and extends longitudinally through the length of the helix portion. The helix portion expanded cross-section tapers from the helix inlet to the helix outlet. The helix vanes project into the fluid stream similarly to helix elbow fitting helix vanes.

A helix discharge amplifier is similar to a helix straight fitting, but includes a straight and continuous taper from the helix portion expanded cross-section inlet to the amplifier outlet, without a reducer, and the amplifier outlet is couplable to a nozzle or other discharge fitting. The helix portion includes a plurality of helix vanes distributed equidistantly around the helix portion cross-section, oriented at an angle of incidence to the incoming fluid stream, and extending the length of the helix portion. A tapered mixing chamber extends from the helix portion outlet to the amplifier outlet.

The helix fittings of the present invention provide many advantages, including: (1) reduced localized pipe wall erosion; (2) reduced system head loss; (3) reduced vibration through pipe bends; (4) improved discharge flow characteristics; and, (5) reduced hose kick for discharge applications.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 12 shows a side view of a Second Embodiment.

REFERENCE NUMBERS USED IN DRAWINGS

Figure 1:
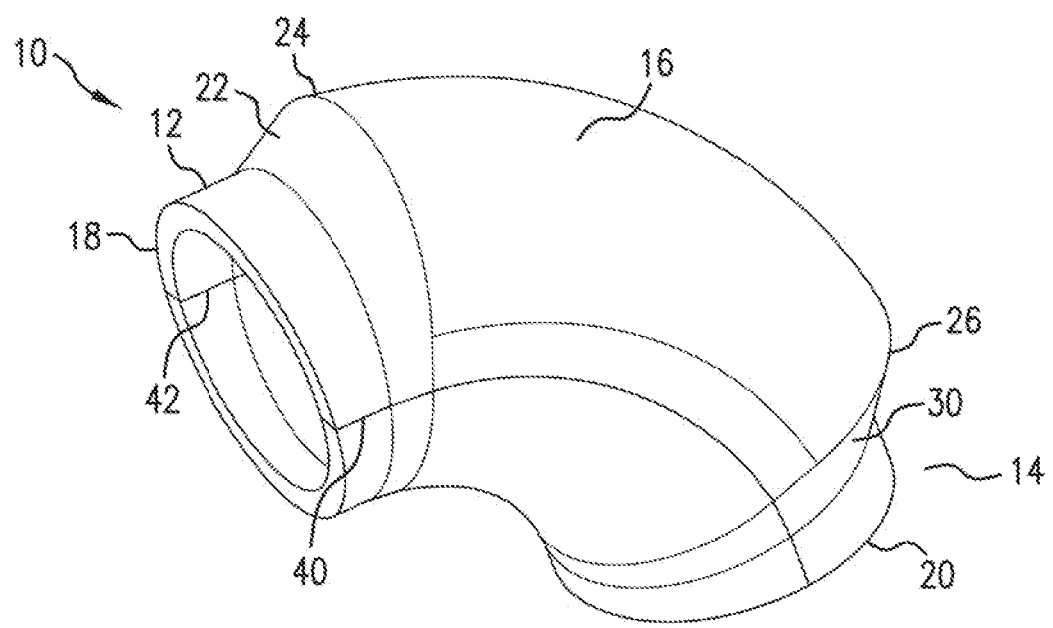
FIG. 1 shows a perspective view of a First Embodiment.
Figure 2:
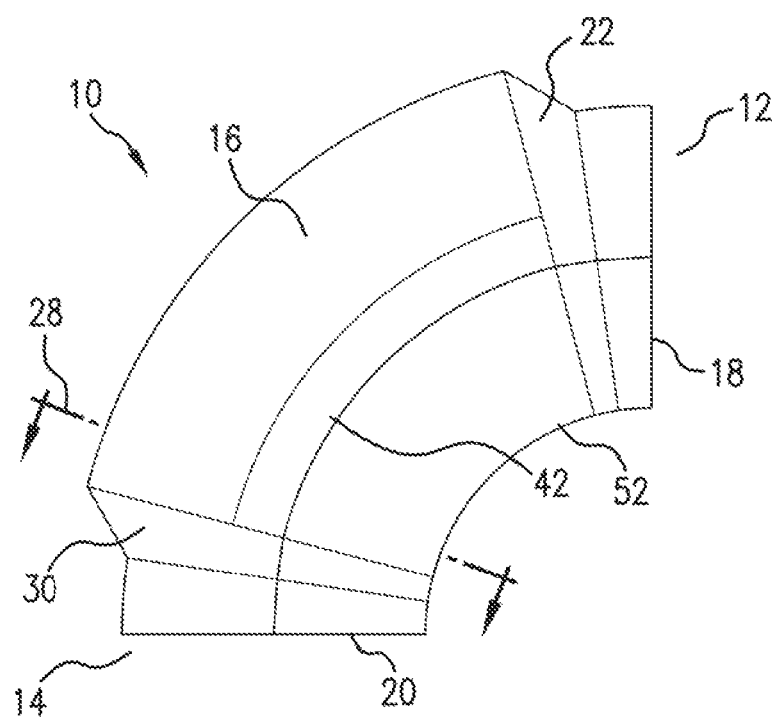
FIG. 2 shows a side view of a First Embodiment.
Figure 3:
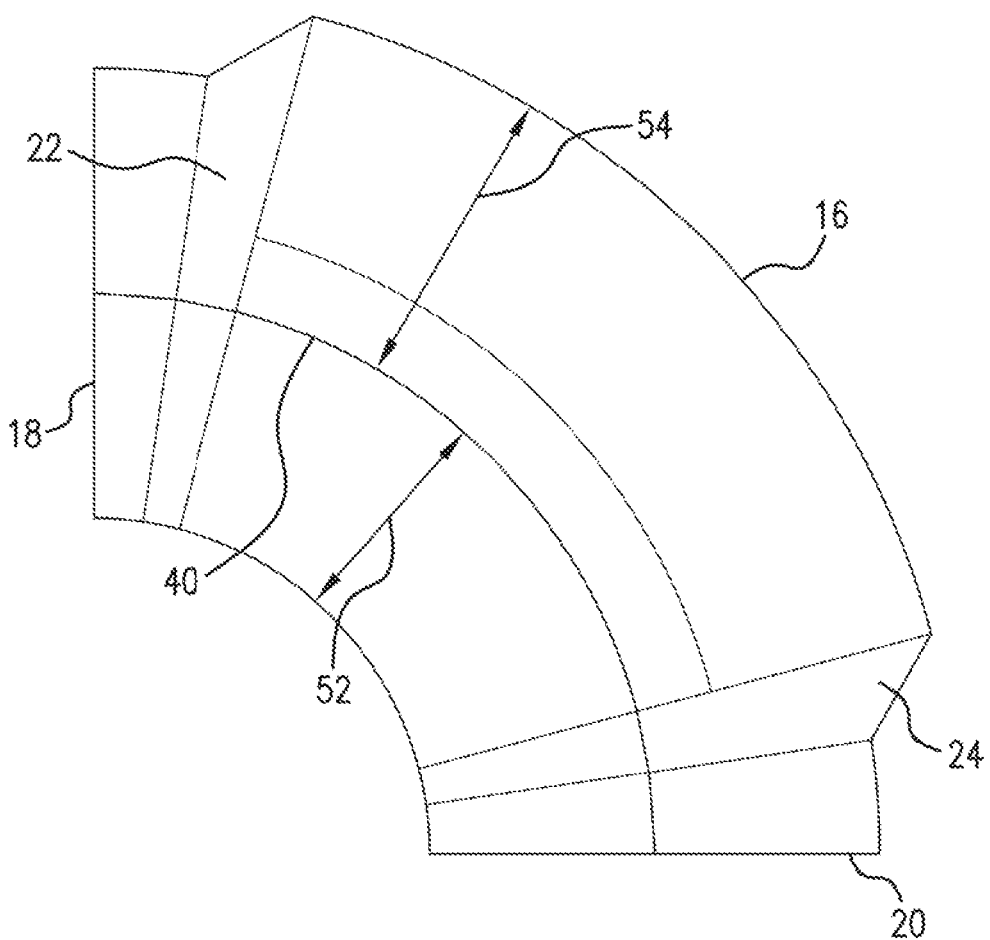
FIG. 3 shows a side view of a First Embodiment.
Figure 4:
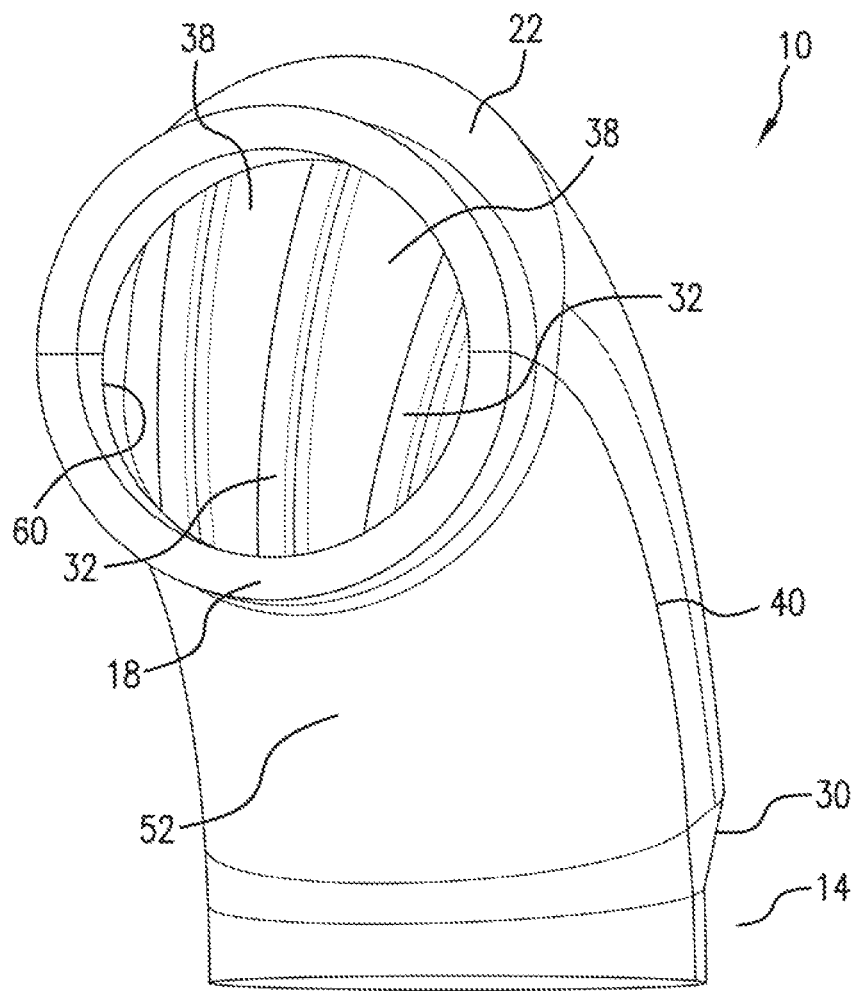
FIG. 4 shows an interior view of the helix portion of a First embodiment, from the inlet.
Figure 5:
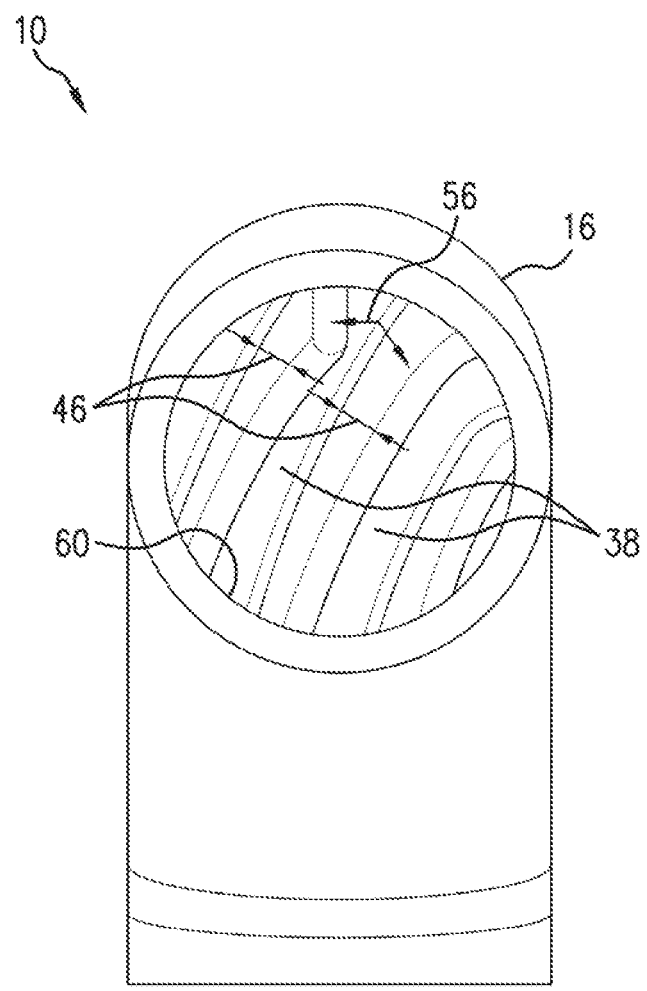
FIG. 5 shows an end-on cutaway view of a First Embodiment, cut through the helix portion.
Figure 6:
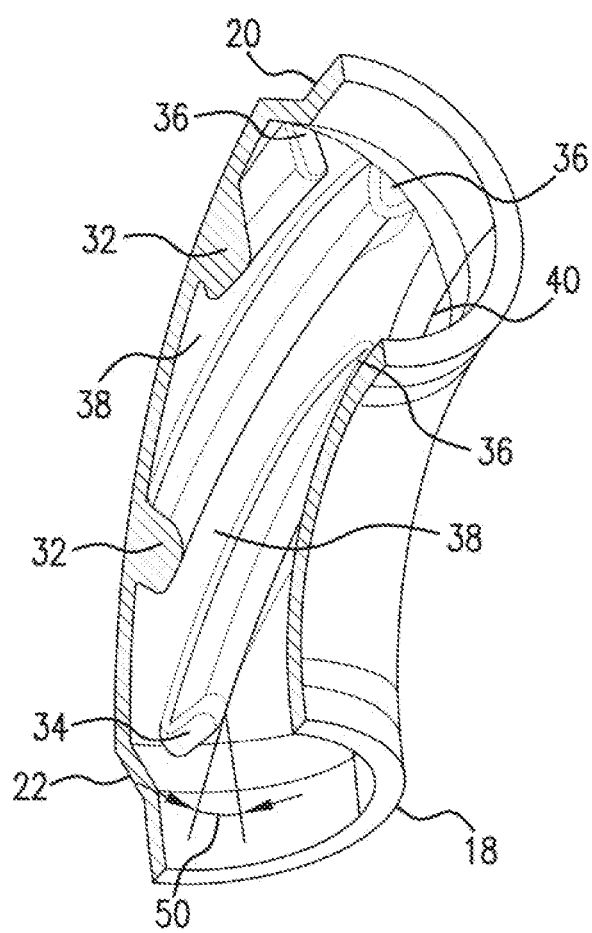
FIG. 6 shows a cutaway view of a First Embodiment, cut front-to-back.
Figure 7:
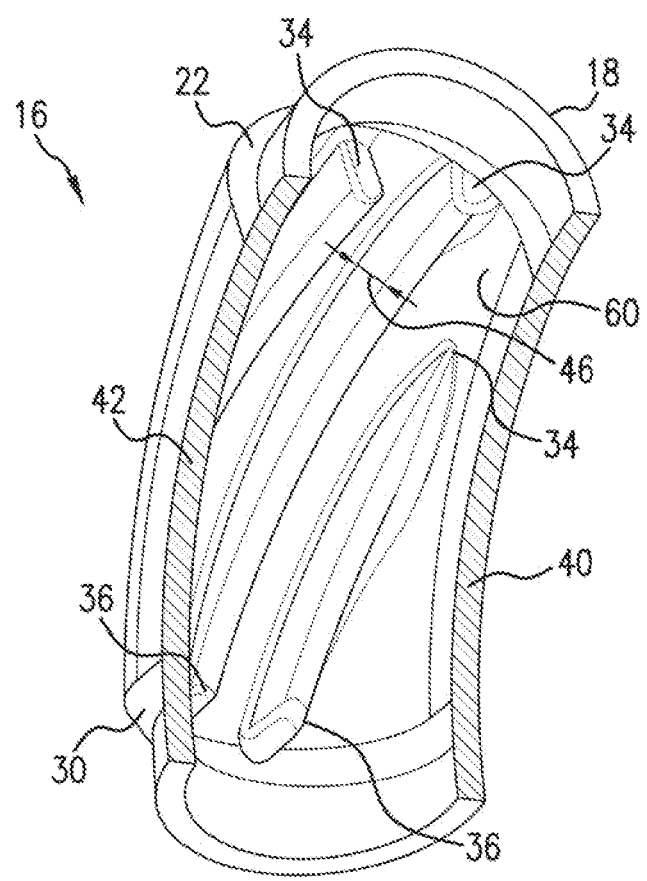
FIG. 7 shows a cutaway view of a First Embodiment, cut along first and second longitudinal transition lines.
Figure 8:
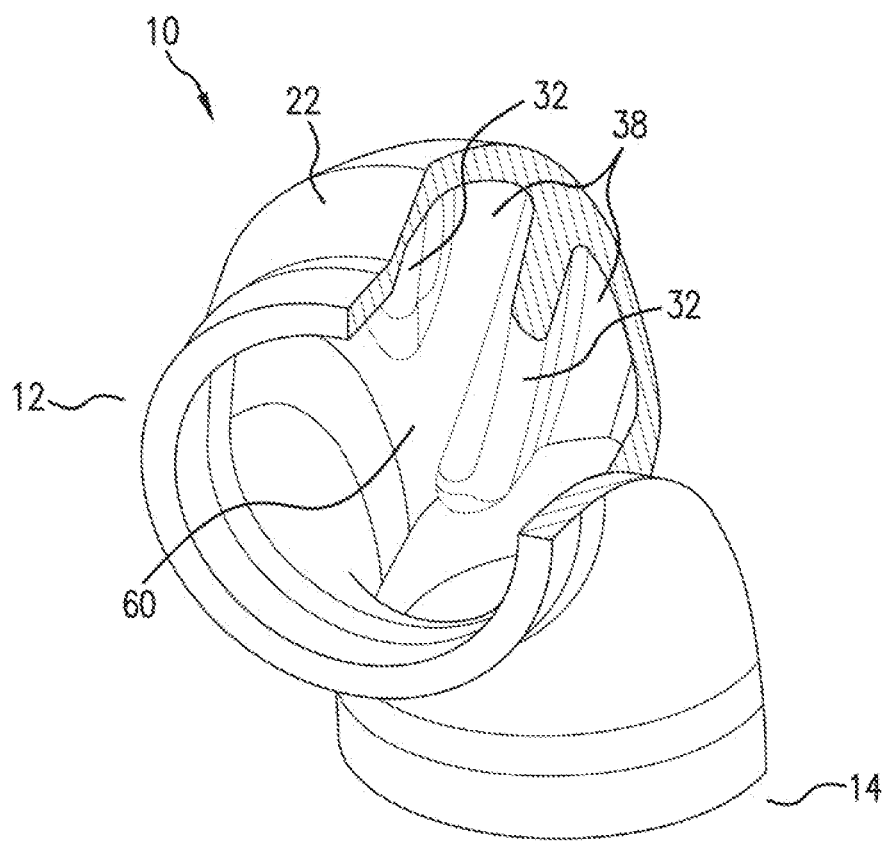
FIG. 8 shows a quarter-cutaway view of the helix portion of a First Embodiment.

Turning now descriptively to the drawings, in which similar reference characters denote similar elements throughout the several views, the figures illustrate several embodiments of the present invention. With regard to the reference numerals used, the following numbering is used throughout the various drawing figures:

10 First Embodiment Helix Elbow Fitting
12 Helix Elbow Fitting Inlet Portion
14 Helix Elbow Fitting Outlet Portion
16 Helix Portion
18 Inlet Coupling
20 Outlet Coupling
22 Expander
24 Helix Portion Inlet
26 Helix Portion Outlet
28 Helix Portion Expanded Cross-Section Area
30 Reducer
32 Helix Vanes
34 Helix Vane First Ends
36 Helix Vane Second Ends
38 Helix Channels
40 First Longitudinal Transition Line
42 Second Longitudinal Transition Line
44 Rotation/Torque Vector Diagram
46 Helix Vane Depth
48 Helix Vane Cross Section Area
50 Helix Vane Angle of Incidence
52 Helix Expanded Cross-Section Front Portion
54 Helix Expanded Cross-Section Back Portion
56 Helix Vane Angle of Attack
58 Helix Elbow Fitting Front Side Pipe Wall
60 Helix Portion Interior Wall
110 Second Embodiment, Helix Straight Pipe Fitting
112 Helix Straight Pipe Fitting Inlet Portion
114 Helix Straight Pipe Fitting Outlet Portion
116 Helix Portion
118 Inlet Coupling
120 Outlet Coupling
122 Expander
124 Helix Portion Inlet
126 Helix Portion Outlet
128 Helix Portion First Expanded Cross-Section
130 Reducer
132 Helix Vanes
134 Helix Vane First Ends
136 Helix Vane Second Ends
138 Helix Channels
140 Not used
142 Not used
144 Rotation/Torque Vector Diagram
146 Helix Vane Depth
148 Helix Vane Cross Section Area
150 Helix Vane Angle of Incidence
152 Not used
154 Not used
156 Helix Vane Angle of Attack
158 Not used
160 Helix Portion Interior Wall
162 Helix Portion Second Expanded Cross-Section
164 Helix Portion Tapered Centerline Channel
210 Third Embodiment, Helix Discharge Amplifier
212 Helix Discharge Amplifier End Cap
214 Helix Discharge Amplifier Outlet Portion/Canister Outlet End
216 Helix Portion
218 End Cap Inlet Coupling
220 Amplifier Discharge Coupling
222 Not used
224 Helix Portion Inlet
226 Helix Portion Outlet
228 Helix Portion Inlet Cross-Section
230 Discharge Mixing Chamber
232a-c Helix Vanes
234a-c Helix Vane First Ends
236a-c Helix Vane Second Ends
238a-c Helix Channels
240 Not used
242 Not used
244 Rotation/Torque Vector Diagram
246 Helix Vane Depth
248 Helix Vane Cross Section Area
250 Helix Vane Angle of Incidence
252 Not used
254 Not used
256 Helix Vane Angle of Attack
258 Not used
260 Helix Portion Interior Wall
262 Helix Portion Second Cross-Section
264 Helix Portion Tapered Centerline Channel
266 Canister
268 Canister Tapered Interior Wall
270 Canister Inlet End
272 Canister Inlet End Diameter
274 Canister Outlet End Diameter
276 Canister First End Threaded Coupling
278a-c Helix Vane Edge
280a-c Helix Vane Inlet Corner
282a-c Helix Vane Outlet Corner
284 Discharge Mixing Chamber Length
286 Helix Portion Taper Angle
310 Fourth Embodiment, Two-Piece Helix Elbow Fitting
310a Helix Elbow Front Portion
310b Helix Elbow Back (Helix) Portion
316 Helix Elbow Helix Portion
386 Helix Elbow First Flange
388 Helix Elbow Second Flange

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In this Specification, references to the "diameter" of a pipe or fitting refer to the inner wall diameter, unless stated otherwise. Similarly, references to the "cross section" of a pipe or fitting refer to the planar area bounded by the interior walls of the pipe or fitting. References to a "nominal pipe" or "nominal fitting" refer to the dimensions or cross-section of the system smooth-interior-walled piping or standard smooth-interior-walled fittings for such piping.

"Elbow" fittings refers to pipe fittings used to change the direction of flow of the piping system, and include any bend angle, not simply 90-degrees. Although the described embodiments are sized to swap out with standardized pipe fittings, the helix elbow fitting is not limited by bend radius or length, which will vary widely depending on the piping system itself.

In the Description, reference may be made to the "front" and "back" of a helix elbow fitting. This refers to the portion of pipe closest to the inside of the bend radius ("front portion") and the portion along the outside of the bend radius of the fitting ("back portion"), respectively, but do not imply that the helix elbow fitting is only used in a horizontal plane.

Referring to FIGS. 1-10 and 11a&b, a First Embodiment is shown comprising a helix elbow fitting 10 with a ninety-degree (90°) bend. Fitting 10 includes inlet portion 12, outlet portion 14, and helix portion 16 extending from helix portion inlet 24 to helix portion outlet 26. Inlet and outlet portions 12 and 14 include inlet and outlet couplings 18 and 20, respectively, which are adapted to tie into the selected piping system based on user needs. Couplings 18 and 20 may use any coupling mechanism compatible with the piping materials and operating conditions. In the embodiment, coupling portions 18 and 20 are simply pipe stub couplings for welding to a nominal pipe.

Helix portion 16 includes a plurality of helix vanes 32 to impart rotational motion to the fluid/media. Helix vanes 32 define corresponding helix channels 38. The inventors have determined that, for general slurry applications, at least three helix vanes 32 are necessary to impart sufficient rotation on the fluid/media to achieve a useful evening of pipe wall wear along the front and back inner walls of an elbow, and to also achieve reduced head loss through the elbow. However, the optimum number of helix vanes 32 and corresponding helix channels 38 depends on the anticipated range of operating conditions, such as pressure, flow velocity, temperature, viscosity, particulate size, specific gravity, and importantly, the nominal pipe diameter, elbow bend angle and bend radius. For example, a 90-degree helix pipe elbow for a 3-inch diameter piping system for a high-specific gravity application such as foundry sand might have six helix vanes 32 spaced over a 6.75-inch long (170 mm) helix portion, whereas a 90-degree helix pipe elbow for a 72-inch (1.8 m) diameter piping system for a slurry mix might incorporate three-hundred or more helix vanes spaced over a 15-foot long (4.6 m) helix portion.

Figure 11A:
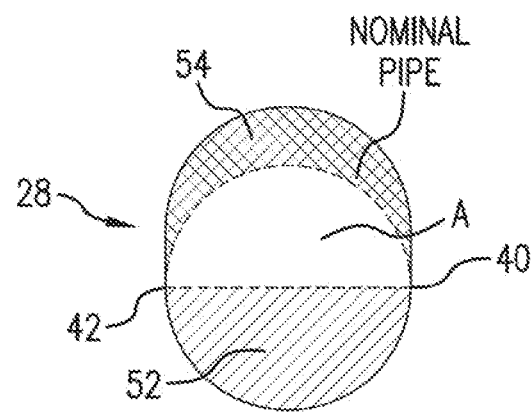
FIG. 11a shows an expanded helix portion cross-section of a First Embodiment.
Figure 11B:
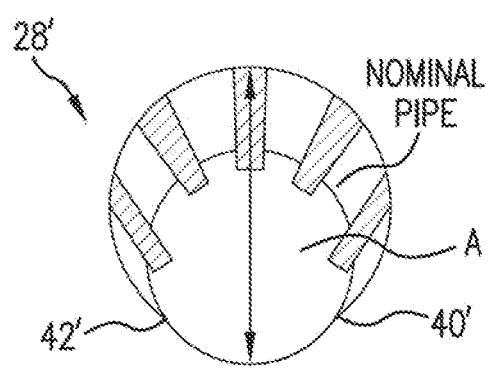
FIG. 11b shows an alternative expanded helix portion cross-section of a First Embodiment, having an oval cross-section.
Figure 13:
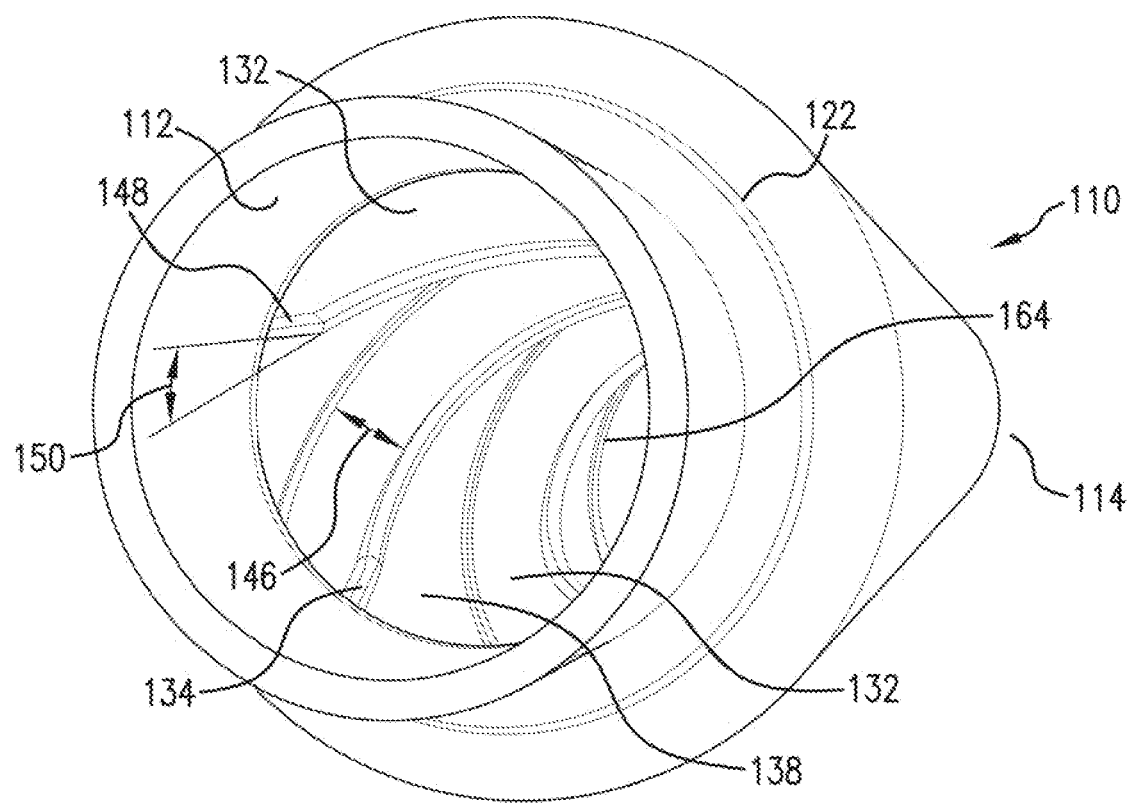
FIG. 13 shows an interior perspective view of a Second Embodiment.
Figure 14:
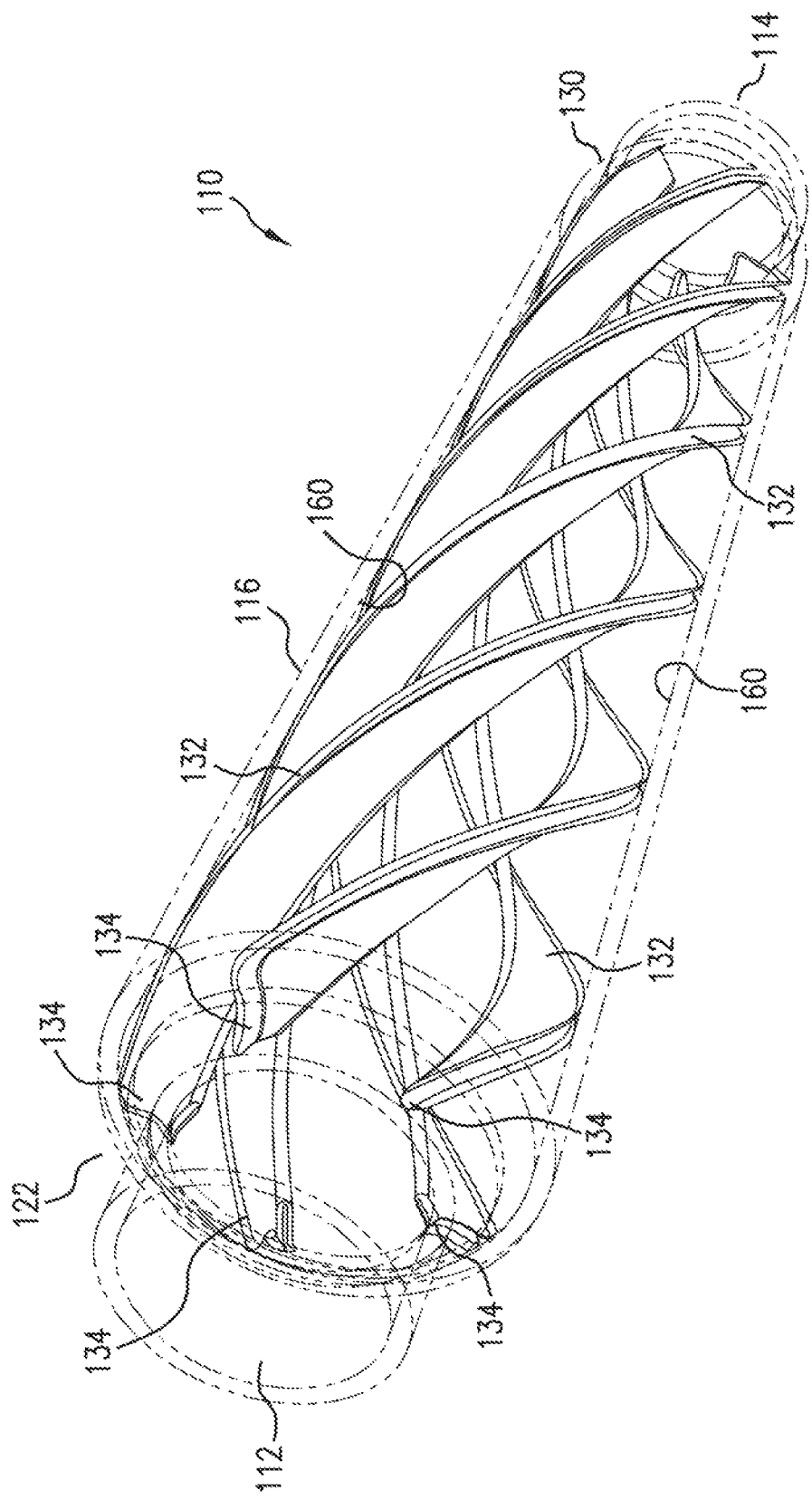
FIG. 14 shows a perspective view of the interior of a Second Embodiment, from the inlet end.
Figure 15:
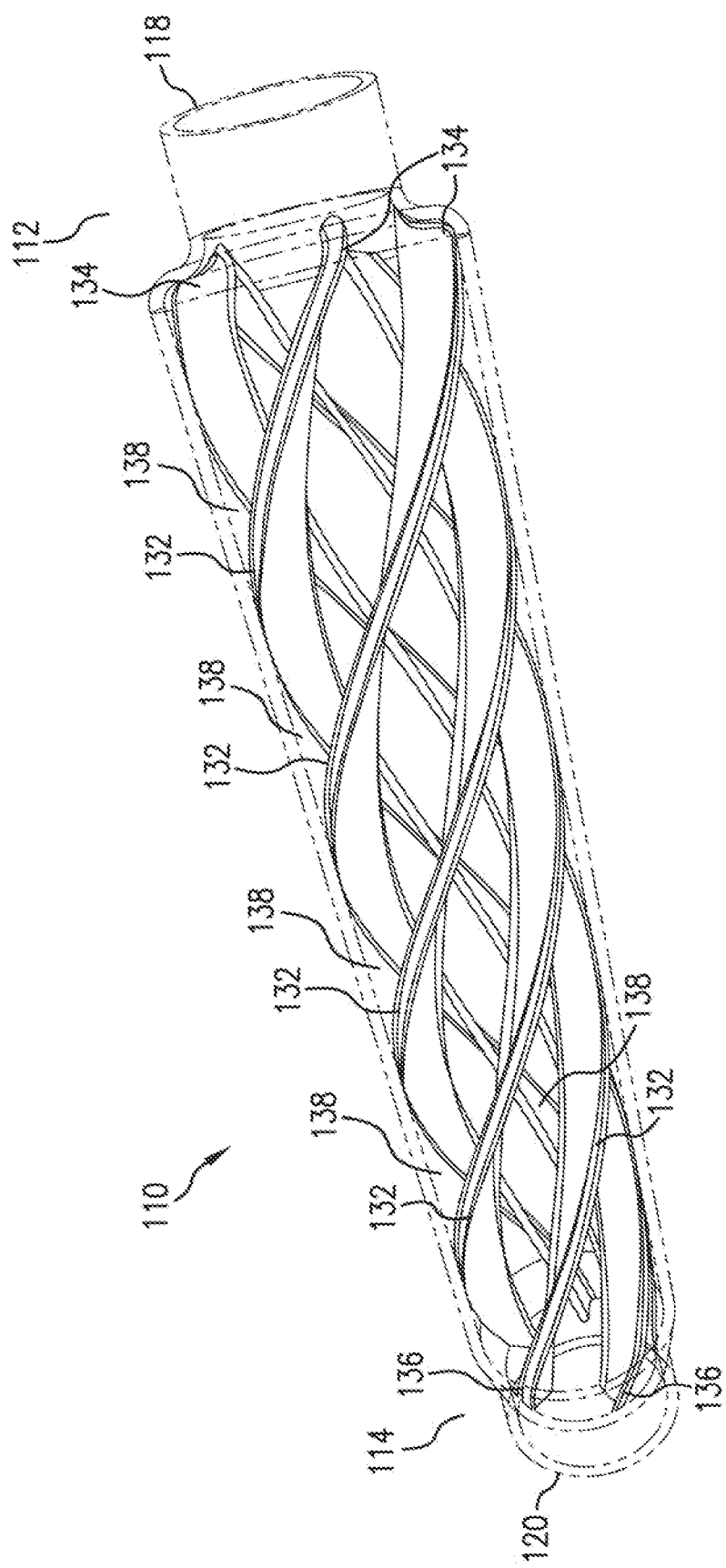
FIG. 15 shows a partially transparent side view of a Second Embodiment.
Figure 16:
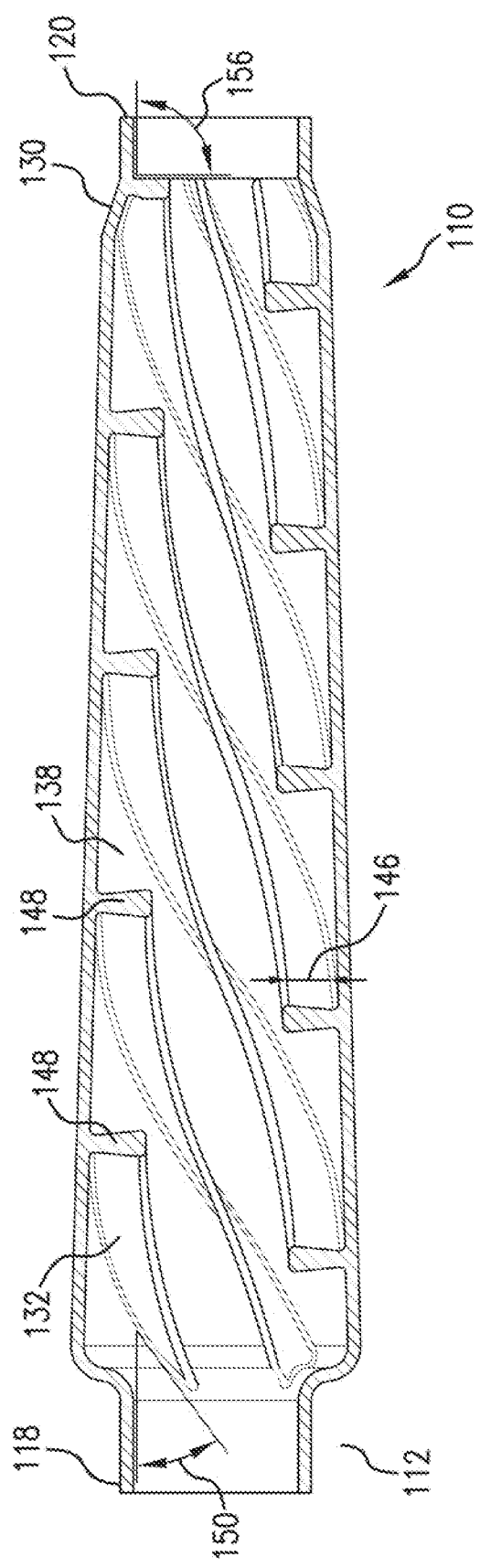
FIG. 16 shows a cutaway side view of a Second Embodiment.
Figure 17:
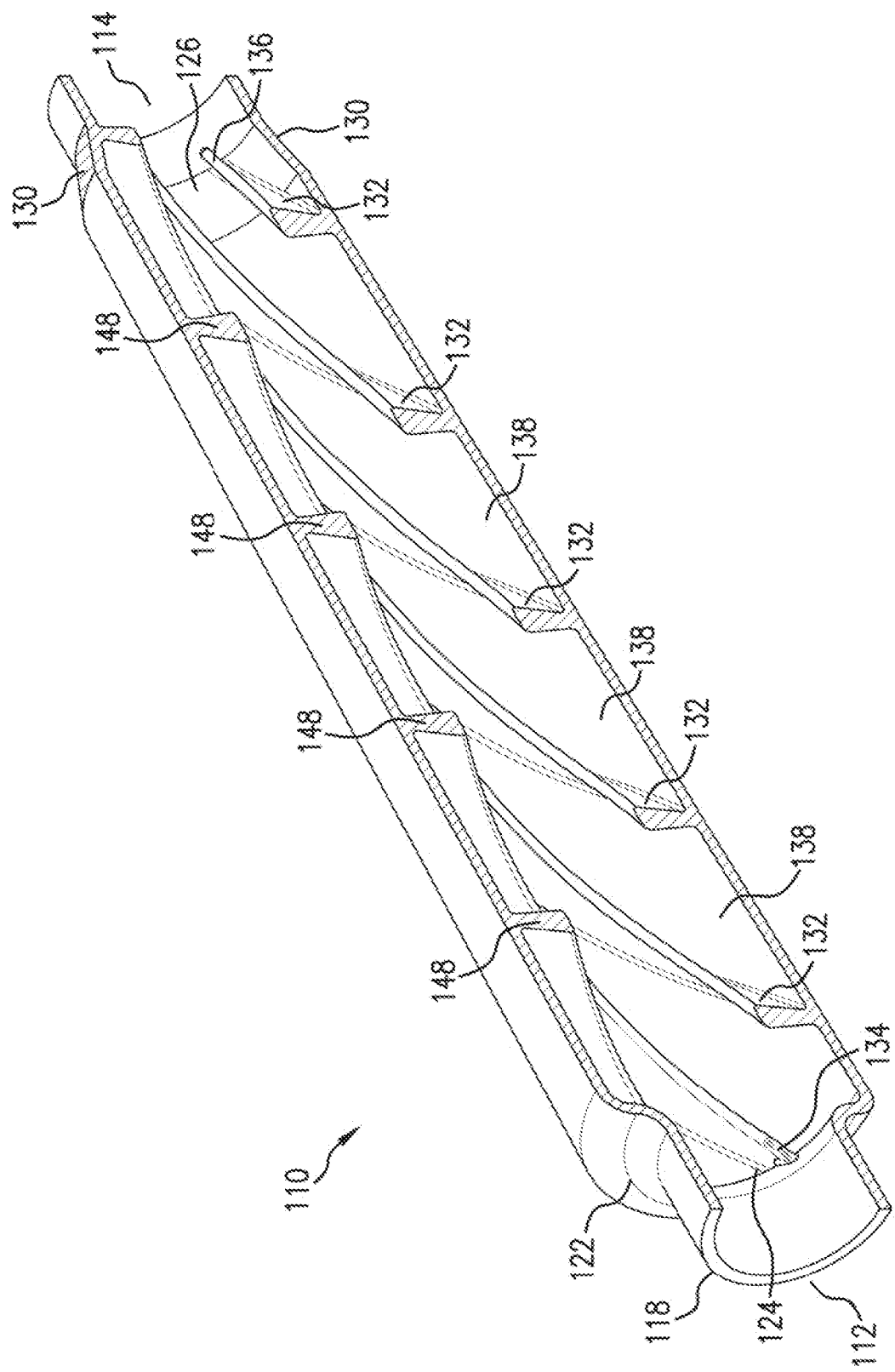
FIG. 17 shows a cutaway side perspective view of a Second Embodiment.
Figure 18:
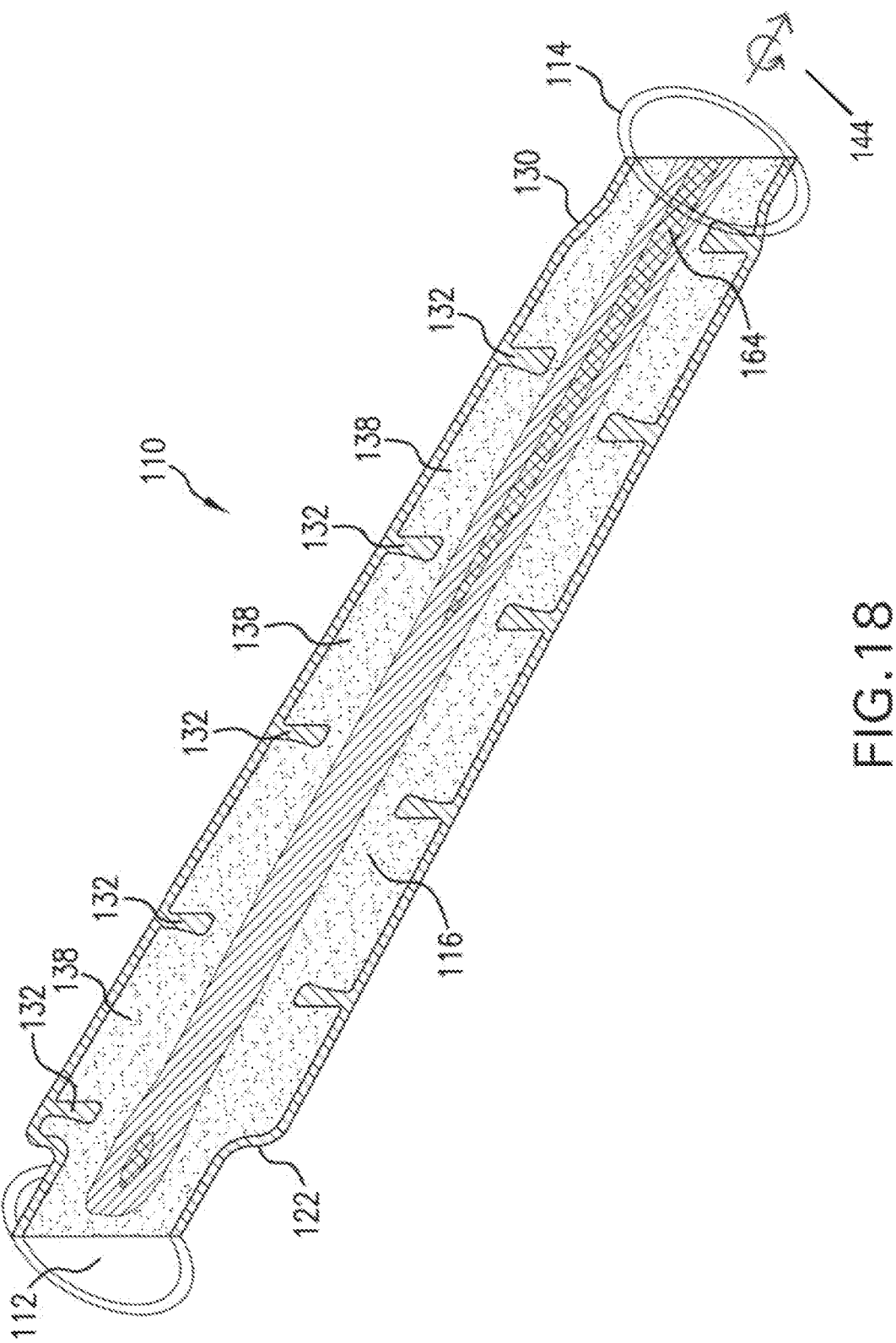
FIG. 18 shows a velocity profile of a Second Embodiment in operation.
Figure 19:
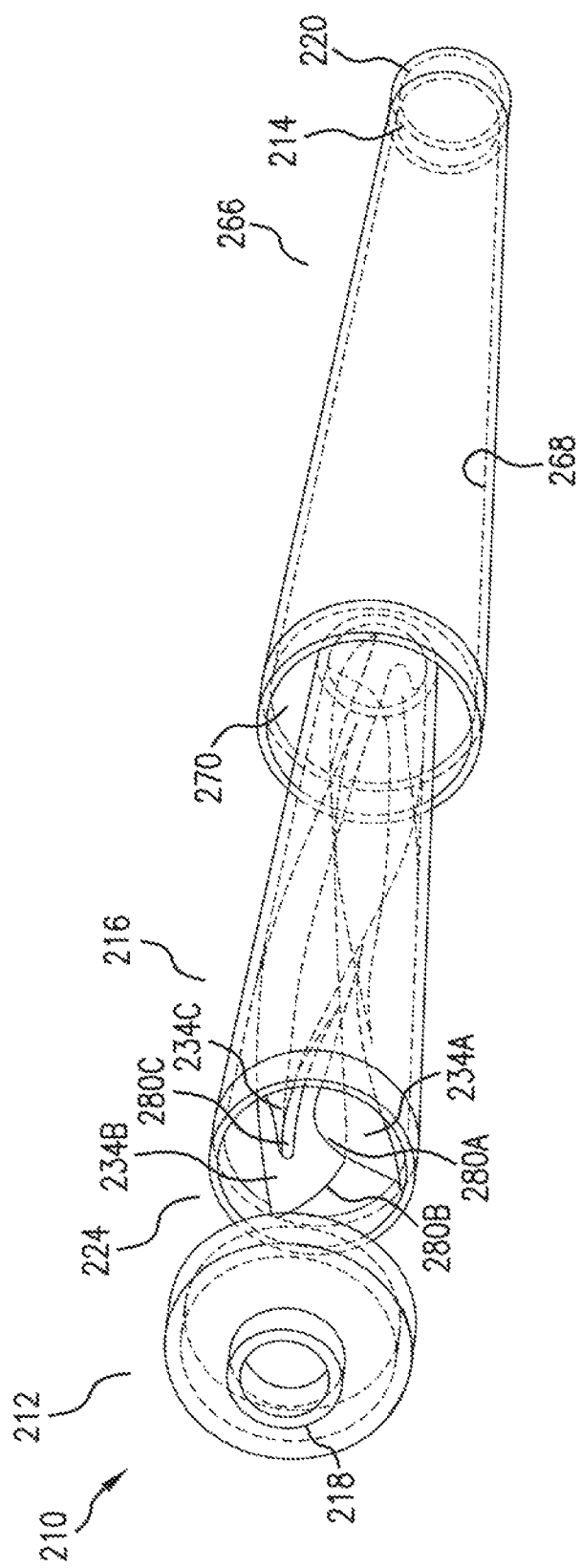
FIG. 19 shows a partially exploded perspective view of a Third Embodiment.
Figure 20:
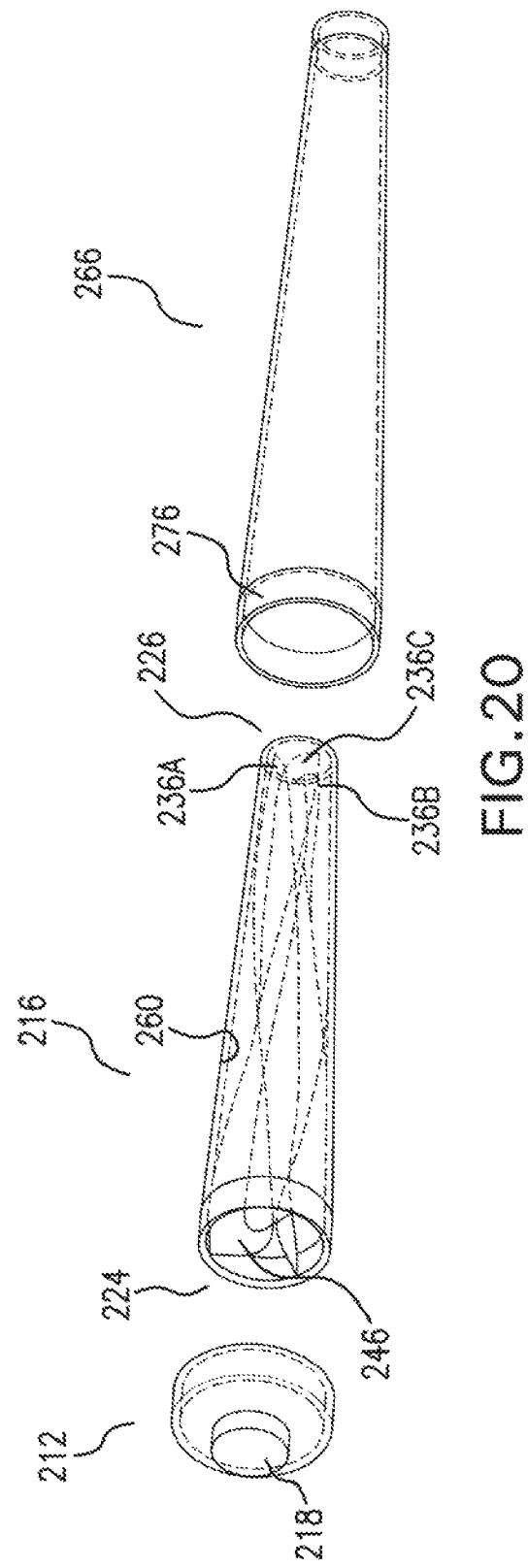
FIG. 20 shows an exploded perspective view of a Third Embodiment.
Figure 21:
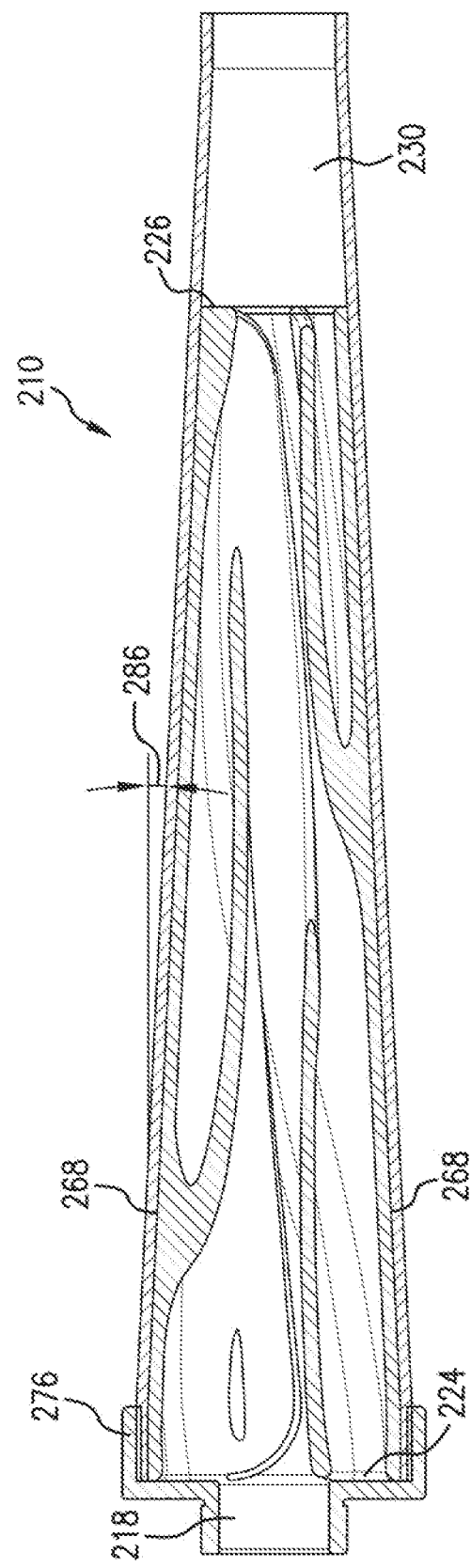
FIG. 21 shows a cutaway side view of an assembled Third Embodiment.
Figure 22:
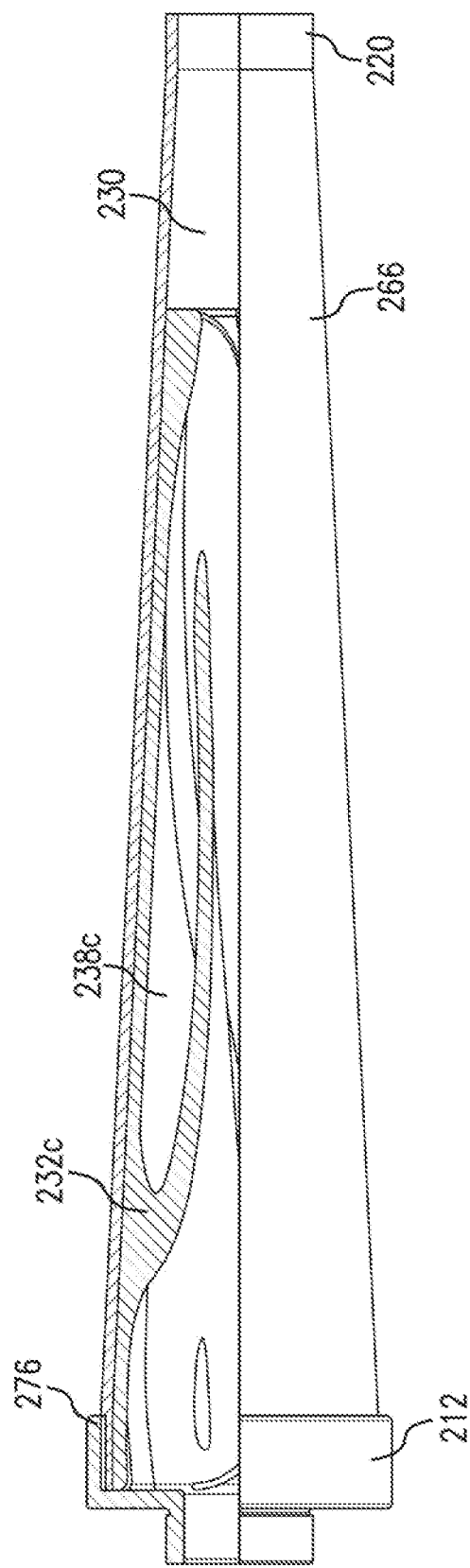
FIG. 22 shows a partial cutaway side view of an assembled Third Embodiment.
Figure 23:
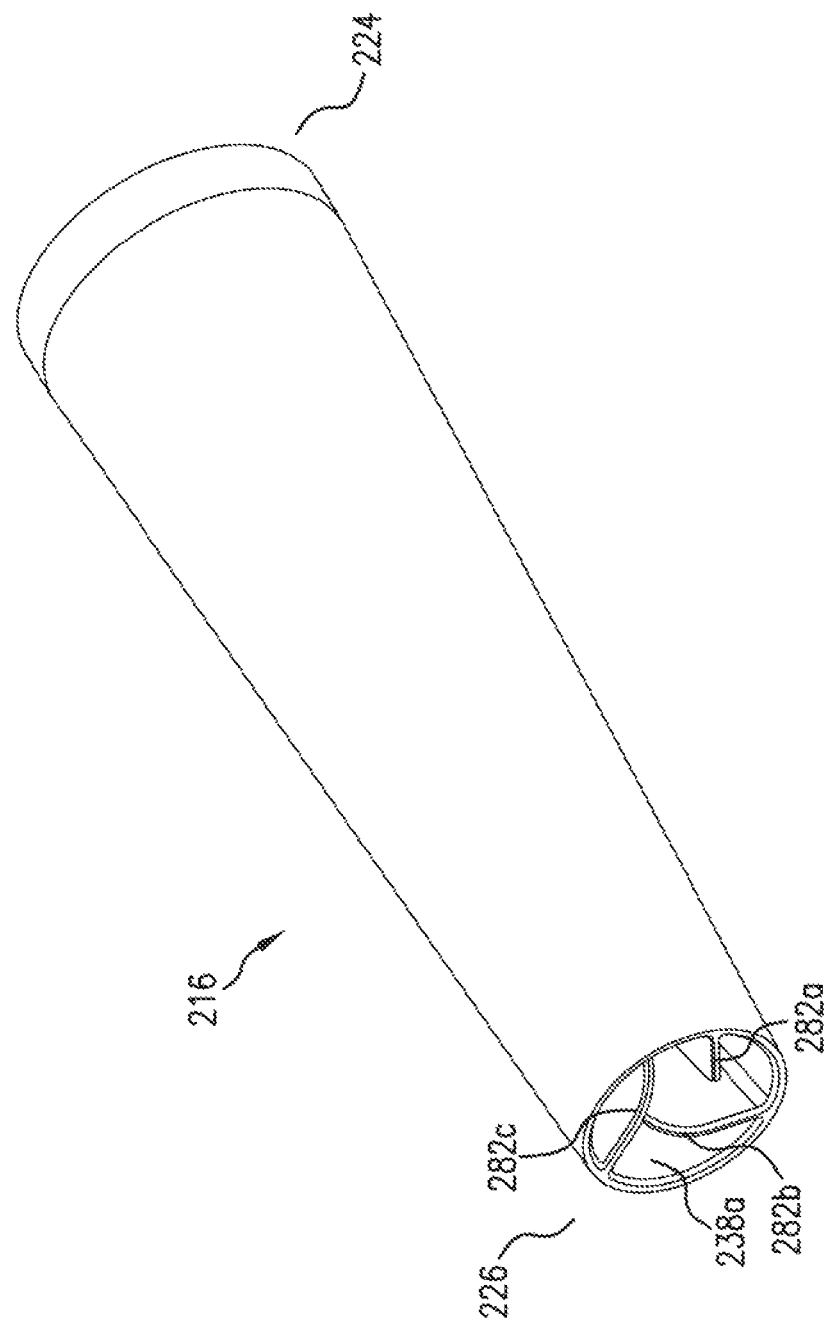
FIG. 23 shows a perspective view of a helix insert of a Third Embodiment.
Figure 24:
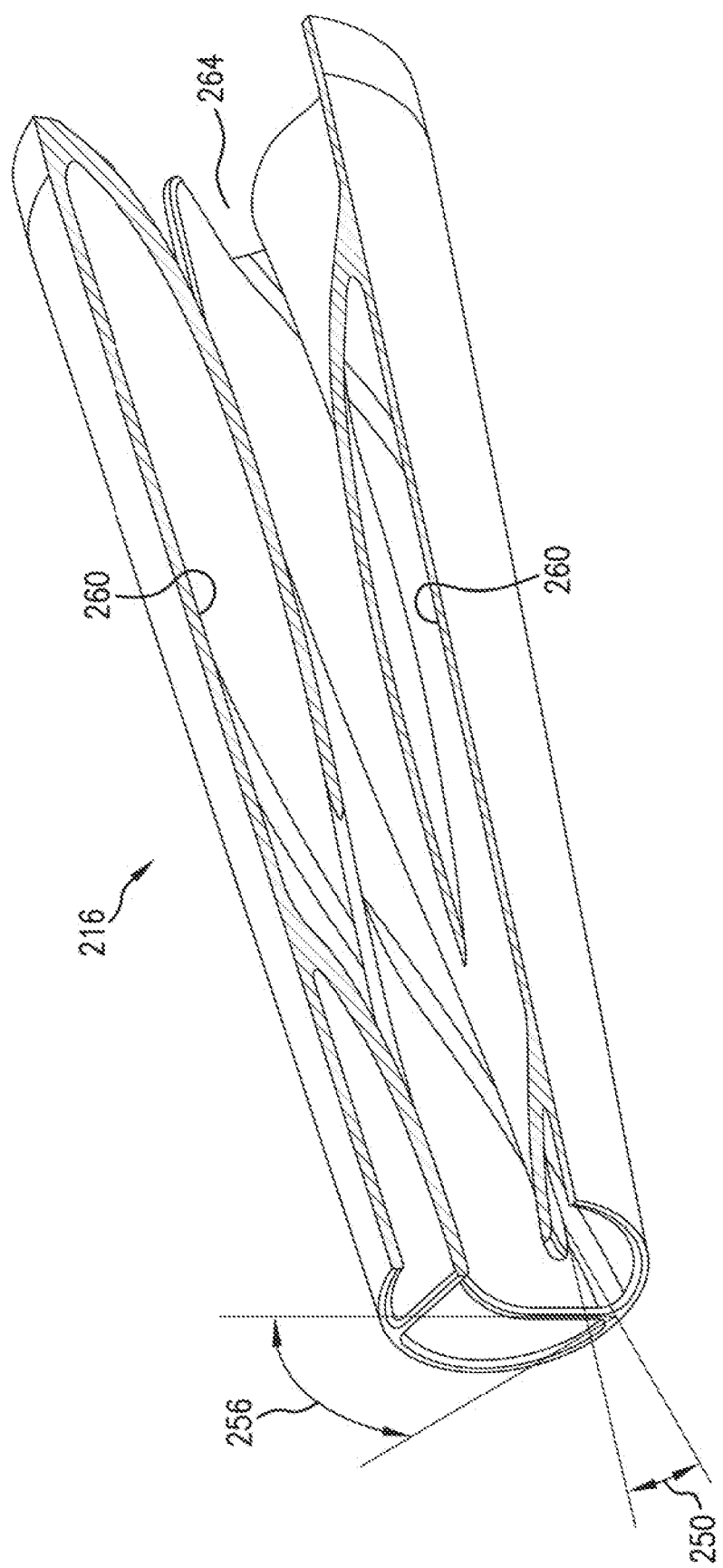
FIG. 24 shows a partial cutaway perspective view of a helix insert of a Third Embodiment.
Figure 25:
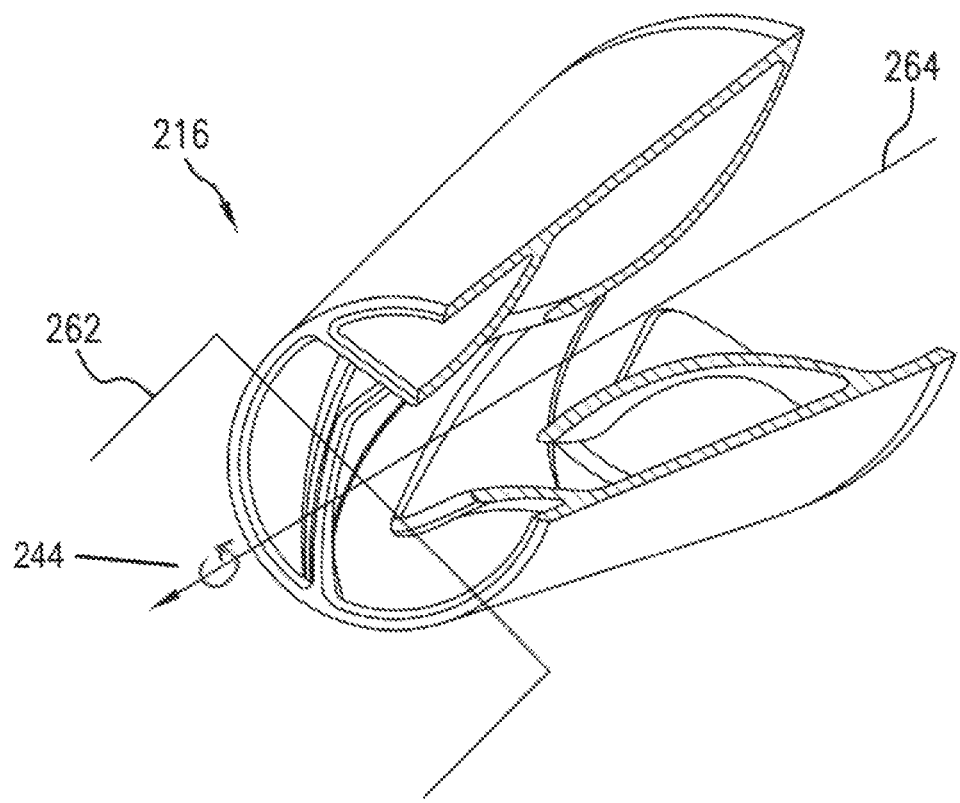
FIG. 25 shows a cutaway discharge-end perspective view of a helix insert of a Third Embodiment.
Figure 26:
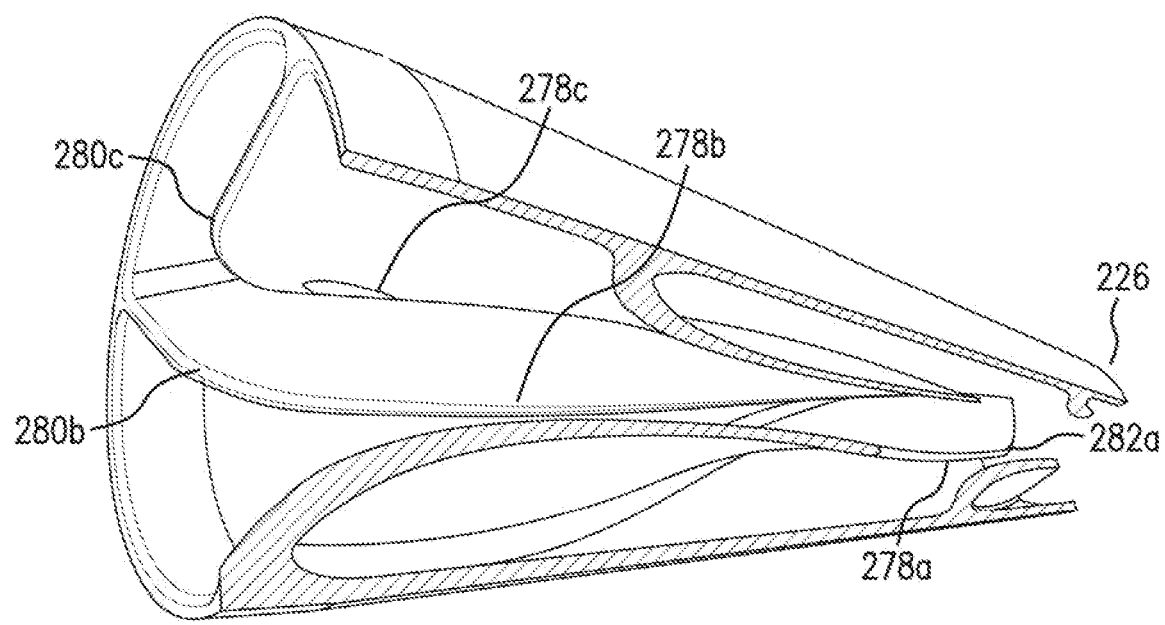
FIG. 26 shows a cutaway inlet-end perspective view of a helix insert of a Third Embodiment.

Helix portion 16 has a cross section 28 which is greater than the cross section A of the system piping interior, expanding out toward the back side portion of helix pipe fitting 10. Helix portion cross section 28 comprises a stadium or oval shape, with the front portion 52 of the stadium or oval matching the nominal pipe diameter and the back portion 54 expanding outward to contain helix vanes 32. In the embodiment, helix portion cross section 28 comprises a stadium with opposed front and back semicircles, 52 and 54 respectively, equivalent to one-half of the nominal pipe interior cross-section. The opposed joints of the front semi-circle 52 and rectangular section of the stadium cross-section 28 define opposed first and second longitudinal transition lines 40 and 42, respectively, of helix portion 16. First and second longitudinal transition lines 40 and 42 are separated by approximately 180-degrees around the front half-circle 52. In cases where helix portion cross section 28 comprises an oval shape, first and second longitudinal axis 40 and 42 would be separated by less than 180-degrees (e.g. see FIGS. 11a and 11b, 40' and 42').

The expanded cross-section 28 serves two functions. First, the expanded cross section compensates for the cross sectional area of helix vanes 32 in order to maintain the effective cross-section of helix portion 16 approximately equal to or greater than the cross section A of the nominal piping system. Helix portion cross section 28 is equal to the sum of A (cross section of the nominal piping system)+n (48) (the total cross sectional areas of helix vanes 32). In the case of an embodiment having helix vanes with cross sections varying along the length of the vane, then the effective cross section of the vanes would be used.

The second function of the expanded cross-section 28, for slurry, wet sand and other high aggregate fluids/media, is to create a deposit zone, where particulates and aggregate continuously are deposited in helix channels 38 and carried out, such that the primary erosion process occurs against these deposits within helix channels 38, rather than the backside pipe wall, thereby extending the life of the helix elbow fitting 10.

Helix vanes 32 extend beyond the nominal inner pipe wall to a helix vane depth 46, slightly past the fluid boundary layer and into the laminar flow portion of the fluid stream. The inventors found that if helix vanes 32 do not extend far enough into the fluid/media, then the helix vanes 32 will create substantial turbulence-induced head loss, high temperatures and vibration, without imparting sufficient rotation to the fluid/media to substantially reduce the head loss compared to the nominal equivalent pipe fitting (e.g. a standard elbow). If helix vanes 32 extend too far, then again the losses from increased friction and induced drag exceeds the gain over a nominal equivalent pipe fitting. Ideally, in a piping system designed to carry a fluid/media having consistent operating conditions the "ideal" helix vane depth 46 would be determined by empirical or predictive modeling methods, because the boundary layer for a given fluid/media will depend on the conditions. In reality, actual operating conditions will vary greatly. Fluid/media which include large proportions of solids and/or aggregates, and dry solids media such as sand and gravel, may not have a well-defined boundary layer. The inventors have determined, by modelling and experimentation under varying conditions representing field applications, that a penetration depth of at least ten percent (10%) of the nominal pipe diameter for symmetric helix fittings, or ten percent (10%) of the major axis diameter for asymmetric helix fittings, are effective to reduce head loss over a broad range of operating conditions.

Inlet portion 12 further includes expander 22, extending from inlet coupling 18 to helix portion inlet 24. Expander 22 transitions from system pipe cross-section A to helix portion cross section 28. Outlet portion 14 further includes reducer 30, extending from helix portion outlet 26 to outlet coupling 20. Reducer 30 transitions from helix portion cross section 28 to system pipe cross-section A, or whatever the immediate downstream system component may be. For example, the downstream nominal pipe diameter might be smaller than the upstream nominal pipe diameter Each of helix vanes 32 extend from a first end 34 disposed along first longitudinal transition line 40 to a second end 36n disposed along second longitudinal transition line 42, with first and second longitudinal transition lines 40 and 42 separated approximately 180-degrees around the helix expanded cross-section front portion 52.

Helix portion 16 extends around at least a portion of the bend angle of helix elbow fitting 10. In the embodiment, elbow fitting 10 has a 90-degree bend angle, and helix portion 16 extends along approximately 45-degrees of the bend angle.

Each of helix vanes 32 is oriented at an angle of incidence 50 to the nominal pipe system fluid/media flow direction. In the embodiment, the angle of incidence 50 is approximately 30-degrees. The inventors have determined that the optimum angle of incidence 50 is between 15-degrees and 45-degrees for typical sand-slurry applications, depending on the anticipated operating parameters. For typical sand-slurry applications, an angle of incidence 50 of less than 15-degrees would not impart sufficient rotation within the span of a typical fitting length to provide substantial net reduction in head loss or even out wear. An angle of incidence 50 of greater than 45-degrees tends to create excessive head loss to induced drag, and leads to "tumble over" effect unless flow velocity is maintained unusually low. "Tumble over effect" refers to the tendency of the fluid/media to simply flow over helix vanes 32—like tumbling over the top of a dam—rather than flowing through helix channels 38 to impart rotation to the fluid/media. "Tumble over" also leads to excessive head loss and high temperatures and vibration. Alternatively, helix vanes 32 could incorporate a variable angle of incidence 50, for example initially 15-degrees and increasing to some maximum, for example 45-degrees. Helix vanes 32 have an angle of incidence 50 to impart a clockwise vorticity, such that the resulting torque vector (exemplified by vector diagram 44) aligns with the nominal pipe system fluid flow direction in accordance with the "Right Hand Rule". For very high density/high particulate media, for example wet-sand and foundry-sand mixes, the optimal angle of incidence 50 may extend to as little as 5-degrees to 15-degrees.

In the embodiment, the angle of attack 56 of helix vanes 32 is ninety degrees, as helix vanes 32 project radially inward, normal to the incoming fluid direction of flow. For slurry and other heavy particulate, heavy aggregate, high specific gravity or high viscosity fluids/media a ninety-degree angle of attack is generally preferable, to prevent material from becoming packed into helix channels 38, rather than loosely deposited. Additionally, a ninety-degree angle of attack is easier to manufacture. However, for applications without such limitations, an angle of attack of less than ninety-degrees may be optimal.

The described helix elbow fitting 10 is effective for bend angles of approximately 10-degrees to approximately 175-degrees. For bend angles of less than 10-degrees, a straight helix reducer (as described in the Second Embodiment) installed immediately upstream of a nominal bend fitting would likely be more effective. For bends greater than 175-degrees, a series of smaller helix elbow fittings would likely be more efficient (for example, 90-degree helix elbow in series with a second 90-degree helix elbow, separated by a short nominal pipe section, to provide a 180-degree bend). A helix elbow fitting 10 could form part of a sweeping continuous curved bend, including sweeping curves equal to or greater than 180-degrees. However, use of helix elbow fittings provide similar head loss reductions and avoid localized erosion, so could achieve similar results in a more compact piping system layout.

In operation, fluid/media entering helix elbow fitting 10 distributes through expander 22 and enters helix portion 16. Fluid/media flowing along the nominal piping system back pipe wall impinges against helix vanes 32, causing it to alter its flow path and velocity profile to follow helix channels 38 in a clockwise rotation. This in turn imparts rotation onto at least the outer layers of the fluid/media stream, with the greatest angular velocity in the fluid/media proximate the helix elbow fitting pipe wall and lower angular velocity along the nominal piping centerline. The angular velocity of the rotating stream, and the asymmetric cross-section 28 of helix portion 16, causes particulates or aggregate (if present) to move toward the pipe wall and create a deposit layer in helix channels 38 within helix portion 16. Under steady-state conditions, fluid/media flowing through helix channels 38 will continuously deposit and entrain particulates or aggregate, achieving an equilibrium condition, such that the primary erosion effect is against this sacrificial layer, rather than the backside pipe wall.

Figure 9:
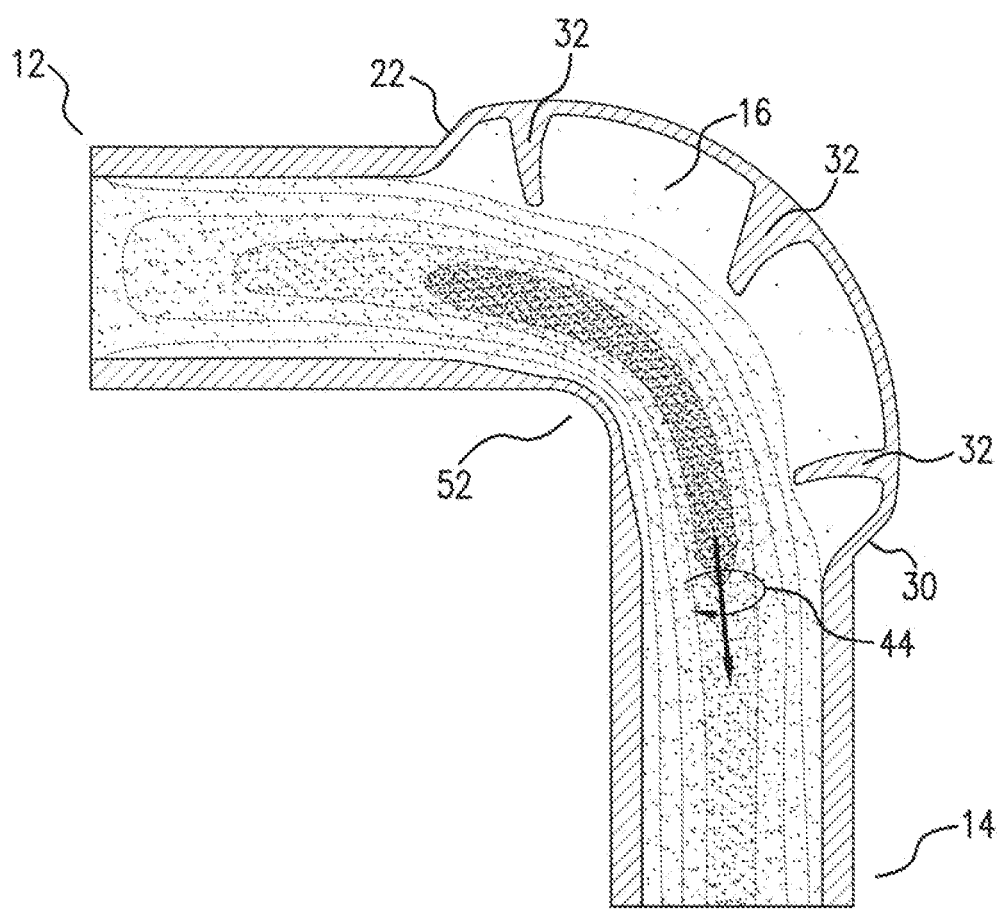
FIG. 9 shows a velocity/pressure profile of a First Embodiment in operation, from a side view.
Figure 10:
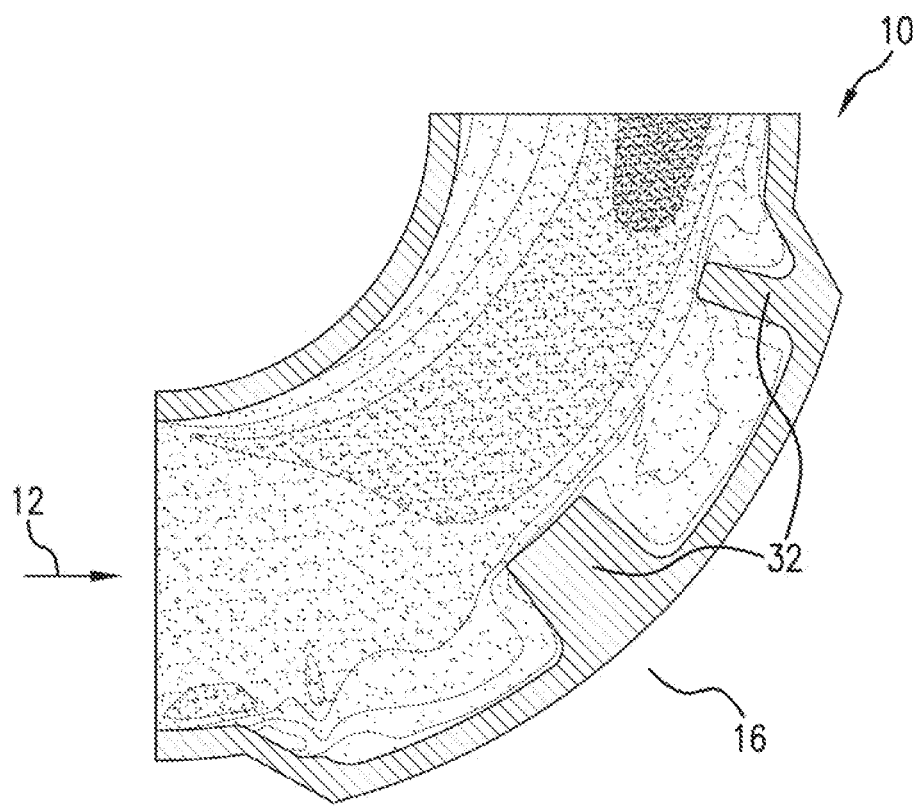
FIG. 10 shows another velocity/pressure profile of a First Embodiment in operation, from a side view.

Referring to FIGS. 9 and 10, velocity profiles of fluid passing through a helix elbow fitting 10 are shown. The rotation of fluid/media through the bend of helix elbow fitting 10 causes the fluid/media to contact the entire circumference of the helix elbow fitting pipe wall, at substantially consistent velocity and angle, such that the pipe wall erodes evenly around its entire circumference, rather than preferentially in a single area, which extends the life of the fitting. FIGS. 9 and 10 demonstrate that the fluid velocities at the front side wall and back side wall are substantially equal, and that the fluid is accelerated toward the helix outlet.

Additionally, helix channels 38 create a channeling effect, which maintains substantially consistent laminar flow conditions within helix channels 38 and continuing around the circumference of helix pipe fitting 10, rather than allowing the flow along the front side pipe wall 58 of the helix elbow fitting to separate from the pipe wall, creating excessive head loss, vibration and pipe wall damage due to vortex shedding and eddies. In addition to the channeling effect, helix channels 38 cause the fluid/media to follow longer—and substantially equal—flow paths rather than simply "turning the corner", thereby effectively creating a longer bend radius and lower flow losses. Water hammer caused by air pocket formation and collapse is largely eliminated, as the laminar flow channeling and reduced turbulence tend to prevent low-pressure/dead-space pockets between opposed vortices where gas pockets may accumulate. Also, the rotation imparts vertical flow vectors, so gas pockets are more easily swept away via helix channels 38.

Helix Straight Pipe Fitting

Referring to FIGS. 12-18, a Second Embodiment is shown, comprising a helix straight pipe fitting 110. The helix straight pipe fitting 110 includes inlet portion 112, outlet portion 114 and helix portion 116. Inlet and outlet couplings 118 and 120, respectively, are provided at either end for coupling into the nominal pipe system. Expander 122 extends from inlet coupling 118 to helix portion inlet 124. Reducer 130 extends from helix portion outlet 126 to outlet coupling 118.

In the embodiment, helix portion 116 has a first expanded cross section 128 at helix portion inlet 124 and tapers to a second expanded cross section 162 along helix portion interior wall 160. In the embodiment, helix portion 116 has symmetrical cross section from first expanded cross-section 128 to second expanded cross-section 162, which is concentric with the nominal system piping. The area of first expanded cross section 128 is at least as large as the nominal inlet pipe cross section A plus the cross sectional area 148 of the helix vanes 132, to maintain approximately the same effective cross-sectional area as the nominal inlet pipe. In the embodiment, the depth 146 of helix vanes 132 is constant, such that the effective flow area reduces along the length of tapered helix portion 116, creating a reducer effect which accelerates flow velocity such that the flow velocity at helix portion outlet 126 is greater than at helix portion inlet 124.

In the embodiment, five helix vanes 132 are provided, spaced equidistantly around the circumference of helix portion interior wall 160. Helix vanes 132 have an angle of incidence 150 to the incoming fluid/media flow so as to achieve a pitch of 1.0, in other words each helix vane 132 circumscribes the interior circumference of helix portion 116 once. In the embodiment, each helix vane 132 has an angle of attack 156 of ninety degrees. Helix vanes 132 do not contact each other, so as to leave an unobstructed tapered centerline channel 164 through helix portion 116.

In the embodiment, the helix straight pipe fitting inlet portion and outlet portion are adapted for the same nominal pipe diameter, but the outlet portion could be configured for a different nominal pipe size, or to couple to a different downstream system component or fitting.

Discharge Flow Amplifier

Referring to FIGS. 19-26, a Third Embodiment is shown comprising a helix discharge flow amplifier 210. Helix discharge flow amplifier 210 includes a canister 266, a helix portion 216 disposed within canister 266, a canister end cap 212 provided at the inlet portion which includes an inlet coupling 218, a discharge mixing chamber 230, and discharge coupling 220.

The Third Embodiment is optimized for a 2.5-inch standard firehose and nozzle combination for use with water and water-foam mix. Canister 266 includes and interior wall 268 tapered from a canister inlet end 270 having an inlet diameter 272 to a canister outlet end 214 having an outlet diameter 274. Canister first end threaded coupling 276 is disposed proximate canister inlet end 270 to sealingly engage end cap 212.

Helix portion 216 extends from a helix portion inlet 224 to helix portion outlet 226. Helix portion 216 includes first, second and third helix vanes 232a-c, each projecting inward from helix portion interior wall 260 to a respective helix vane edge 278a-c, and each extending longitudinally from a respective first helix vane end 234a-c proximate helix portion inlet 224 to a respective second helix vane end 236a-c proximate helix portion outlet 226. Helix vanes 232a-c are distributed equidistantly at 120-degree intervals around the interior wall 260 of helix portion 216, and each of helix vanes 232a-c has an angle of incidence 250 to the fluid flow direction. In the embodiment, the angle of incidence is such that each helix vane 232a-c circumscribes approximately 180-degrees of the interior wall 260 of helix portion 216, or a 0.5 pitch. In the embodiment, helix vanes 232a-c are oriented at an angle of attack 256 of less than ninety degrees, such that they do not project radially from the interior wall 260 of helix portion 216, thereby reducing flow separation losses, and with helix vane edges 278a-c defining a central tapered longitudinal open channel 264. In the embodiment, three helix vanes 232a-c are provided, which provides substantial head loss reduction, balanced rotation for improved nozzle handling, concentrated discharge pattern, and reasonable manufacturing costs using conventional manufacturing methods. However, optimization for specific fluid/media for operation under known pressure/viscosity/flow conditions, and without manufacturing cost restrictions, may utilize more than three helix vanes 232, and may utilize a greater or lesser angle of incidence 250 and/or angle of attack 256.

In the embodiment, each of helix vane inlet corners 280a-c, respectively, and helix vane outlet corners 282a-c, respectively, are radiused in the plane of the respective helix vane. In the embodiment, the helix vane corners 280a-c and 282a-c have approximately a 1.0-inch (25.4 mm) radius. The inventors found that when the helix discharge amplifier of the embodiment was used with aqueous film forming foam ("AFFF", commonly used for fighting petroleum and certain chemical fires) sharp helix vane corners 280a-c and 282a-c caused the AFFF foam-water-mixture to expand within helix flow amplifier 210. This expansion created severe loss of flowrate due to the two-phase flow. The inventors found that providing radiused helix vane corners 280a-c and 282a-c substantially eliminated this problem. For applications where the helix flow amplifier 210 would not be used with foaming agents, e.g. water-blasting or irrigation applications, the radiused helix vane corners may not provide substantial advantage.

The tapered interior wall 268 of canister 266 extends past helix portion outlet 226 to canister outlet end 214 (which also forms the helix discharge amplifier outlet portion) defining discharge mixing chamber 230. In the embodiment, the length 284 of mixing chamber is equal to or greater than helix portion inlet diameter 228. In the embodiment, designed for a standard 2.5-inch firehose and nozzle operating at a supply system pressure of 30-250 psig, the helix portion inlet diameter is approximately 3.7 inches (94 mm) and mixing chamber length 284 is approximately 4 inches (102 mm).

For standard firehose/water cannon applications, where supply pressure and flow conditions can vary substantially but the hose and nozzles tend to be standard or comprise a limited set of configurations, the inventors have determined that a helix portion taper 286 in the range of 2-degrees to 10-degrees provides good flow amplification and relative compactness. In the embodiment, for a 2.5-inch firehose, the helix portion taper 286 is 2.27°. In modelling and testing an embodiment for a 1.5-inch standard firehose operating in the range 30-200 psig, the inventors determined that a helix portion taper of 3° provided a good balance of flow amplification and relative compactness. In modelling and testing an embodiment for a 5.5-inch water cannon operating in the range 70-350 psig, the inventors determined that a helix portion taper of 8° provided an optimal balance of flow amplification and relative compactness.

In the embodiment, helix portion 216 is a removable insert, having a taper angle 286 which matches the taper of canister tapered interior wall 268. End cap 212 holds helix portion insert 216 in place, and during operation the water pressure naturally presses helix portion insert 216 tightly against canister tapered interior wall 268, thereby preventing helix portion insert 216 from spinning during operation. A mechanical locking mechanism could also be provided for backup, such as a slot-and-key engagement or other mechanism. Helix portion insert 216 is made from a polymer selected to have thermal and expansion/contraction characteristics which are similar to the material used for canister 266 within the anticipated temperature operating range, so as to remain firmly engaged against the tapered interior wall 268 of canister 266, even when fluid and environmental temperatures vary.

Providing a removable helix portion 216 has additional advantages. The helix portion 216 is a complex shape which would be expensive to manufacture in metal, which is the typical material used for firefighting hose fittings (brass and/or aluminum), but less expensive to manufacture using plastics. Additionally, the helix portion 216 is subject to wear, and damage. Providing a lightweight, less expensive and more readily replaceable insert reduces lifecycle costs and permits rapid replacement repair under field conditions.

Discharge coupling 220 is connected to canister outlet end 214, to provide a coupling for a discharge nozzle. In the embodiment, discharge coupling 220 is a threaded fitting to couple to a typical 2.5-inch firefighting hose nozzle.

In operation of the Third Embodiment, helix portion insert 216 is inserted into canister 266 until it is fully engaged against the tapered interior wall 268 of canister 266. End cap 212 is threaded onto canister first end threaded coupling 276. A 2.5-inch firehose is threaded to end cap inlet coupling 218, a 2.5-inch firehose nozzle is threaded to amplifier discharge coupling 220, and the firehose is pressurized. When the firehose nozzle is opened to allow flow, the helix portion vanes 232a-c impart rotation to the water stream, and cause the flow to separate into three separate rotating flow streams, converting much of the linear momentum of the water stream into angular momentum, exemplified by vector diagram 244. Looking out through discharge 214, the rotation is clockwise, such that application of the Right Hand Rule results in a torque vector aligned with the direction of the discharge flow. The three separated rotating flow streams recombine into a single rotating flow stream when they pass through discharge mixing chamber 230, and maintain this unified rotating stream through canister/amplifier outlet 214 and the firehose nozzle.

The result is that the discharge flow out of the firehose nozzle is much more concentrated than a non-rotated stream, and maintains this concentration for a much greater distance. Additionally, the head losses are reduced, both due to the rotation and the fact that no flow straightener is required upstream of the firehose nozzle as in conventional non-rotated systems. The reduced head losses provide for greater flow volume over the pressure range. The operator may adjust supply pump pressure as well, to further optimize operation with a particular hose-nozzle configuration.

Importantly, the angular momentum and resulting torque vector 244 substantially reduce the backward force felt by the nozzle operator during operation. Application of Newton's Third Law of Momentum means that, for a purely linear flow system, the nozzle operator must apply an equal and opposite force to overcome the momentum of over 100 gpm of water exiting the hose nozzle at high pressure. Typically, a team of three operators is required to safely handle a standard 1.5-inch (38 mm) or 2.5-inch (64 mm) firehose: a nozzleman, a backup nozzleman to support the nozzleman and provide a relief when the nozzleman gets fatigued, and a hoseman to move the firehose into alignment with the nozzleman. However, with the discharge amplifier 210 coupled between the hose and the nozzle, a single operator can handle the firehose and nozzle, without assistance, even at full pressure and flow. In operation, trained firefighters using a discharge flow amplifier 210 could operate a 2.5-inch (64 mm) firehose nozzle at full flow using only one arm.

Although the described Third Embodiment is configured for use with a firehose and nozzle, a discharge flow amplifier 210 is useful for many applications requiring a concentrated water stream discharge, such as water-blasters used for mining/sluicing, irrigation sprinklers, decorative fountains, water cannon for riot control, and other uses.

Figure 27:
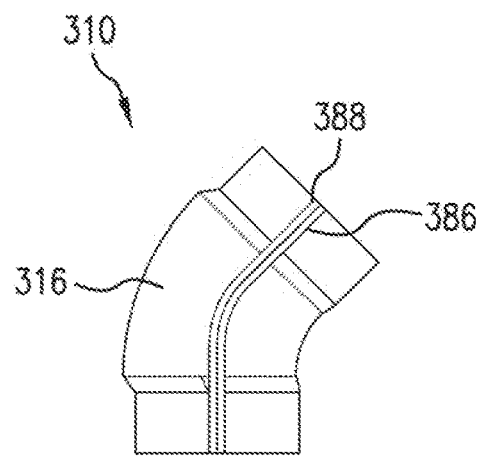
FIG. 27 shows a side view of a Fourth Embodiment.
Figure 28:
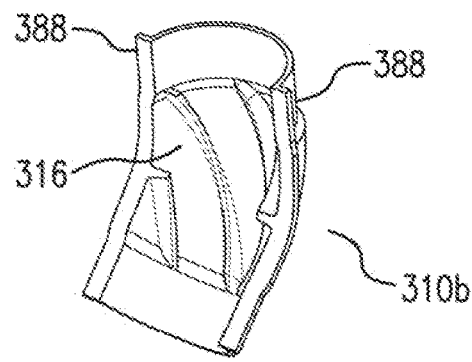
FIG. 28 shows the helix portion of a Fourth Embodiment.
Figure 29:
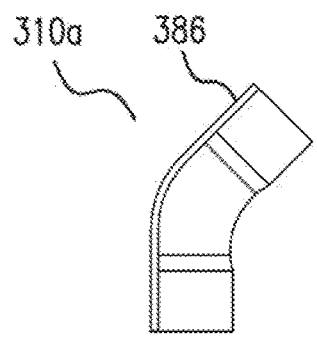
FIG. 29 shows the front side portion of a Fourth Embodiment.

Referring to FIGS. 27-29 a Fourth Embodiment is shown. In the fourth embodiment of a helix elbow fitting 310, an alternative method of construction is demonstrated whereby the helix elbow fitting 310 is manufactured in first and second parts 310a and 310b, which can be coupled together, either by bolting the corresponding mating flanges 386 and 388, or by welding. In the embodiment, first part 310a is essentially the front part of a standard elbow fitting for the nominal piping system diameter, and second part 310b includes the expanded helix portion 316. Second part 310b could also be welded to an existing elbow fitting after cutting out its back side portion. In operation the embodiment works the same as the helix elbow fitting described in the First Embodiment 10.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A helix straight pipe fitting for a piping system having a nominal upstream pipe interior diameter and a nominal downstream pipe inner diameter, the helix straight pipe fitting comprising:
   an inlet, including an inlet connection portion, and an opposed outlet, including an outlet connection portion;
   a helix portion extending from a helix portion inlet having a first expanded cross-section relative to the nominal upstream pipe cross-section to a helix portion outlet having a second expanded cross-section relative to the nominal downstream pipe cross-section, the expanded cross-sections symmetrical and concentric with the respective upstream and downstream nominal pipe cross-sections, the helix portion further including a plurality of helix vanes disposed equidistantly around the circumference of the helix portion and extending along the length of the helix portion, each of the helix vanes extending from a helix vane first end proximate the helix portion inlet to a helix vane second end proximate the helix portion outlet, and oriented at an angle of incidence to the incoming fluid or media, wherein the helix vane first end is upstream of the helix vane second end;
   an expander extending from the inlet connection portion to the helix portion inlet; and,
   a reducer extending from the helix portion outlet to the outlet connection portion;
   wherein each helix vane projects past the nominal upstream pipe inner wall circumference into the fluid flow.

2. The apparatus of claim 1, further comprising:
   wherein the helix portion second cross-section is smaller than the helix portion first cross-section, and the helix portion includes a continuous taper from the helix portion first cross-section to the helix portion second cross-section.

3. The apparatus of claim 2, further comprising:
wherein the downstream nominal pipe diameter is less than the upstream nominal pipe diameter.

4. The apparatus of claim 1, further comprising:
wherein the angle of incidence of each of the helix vanes creates a pitch of at least 1.0, such that each helix vane circumscribes the helix portion inner wall at least once over the length of the helix portion.

5. The apparatus of claim 1, further comprising:
wherein the plurality of helix vanes includes at least three helix vanes.

6. The apparatus of claim 1, further comprising:
wherein each helix vane projects past the nominal downstream pipe inner wall circumference into the fluid flow.

7. The apparatus of claim 1, further comprising:
wherein each helix vane projects into the fluid flow greater than the outer boundary layer of the fluid stream in the nominal pipe inlet.

8. The apparatus of claim 1, further comprising:
wherein each helix vane projects past the nominal pipe inner wall circumference into the fluid flow by an amount at least 10 percent of the nominal pipe inner diameter.

9. The apparatus of claim 1, further comprising:
wherein each helix vane projects past the nominal pipe inner wall circumference into the fluid flow by an amount at least 10 percent of the first helix portion expanded cross-section diameter.

* * * * *